United States Patent
Akaiwa et al.

(10) Patent No.: US 9,888,221 B2
(45) Date of Patent: Feb. 6, 2018

(54) PROJECTOR, PROJECTION DISPLAY SYSTEM, AND CORRESPONDING METHOD AND RECORDING MEDIUM

(71) Applicant: SEIKO EPSON CORPORATION, Tokyo (JP)

(72) Inventors: Shoichi Akaiwa, Matsumoto (JP); Tomohiro Nomizo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 96 days.

(21) Appl. No.: 14/993,654

(22) Filed: Jan. 12, 2016

(65) Prior Publication Data
US 2016/0127703 A1    May 5, 2016

Related U.S. Application Data

(60) Division of application No. 14/144,993, filed on Dec. 31, 2013, now Pat. No. 9,270,729, which is a
(Continued)

(30) Foreign Application Priority Data

May 31, 2000   (JP) .................................. 2000-161876
Jun. 12, 2000  (JP) .................................. 2000-175849
Jun. 12, 2000  (JP) .................................. 2000-175868

(51) Int. Cl.
*G09G 5/00*      (2006.01)
*H04N 9/31*      (2006.01)
(Continued)

(52) U.S. Cl.
CPC ........... *H04N 9/3179* (2013.01); *G03B 21/14* (2013.01); *G06F 3/0486* (2013.01); *G06F 3/14* (2013.01);
(Continued)

(58) Field of Classification Search
CPC ....... H01L 67/024; G06F 3/14; G06F 3/0486; G06F 21/84; G03B 1/14; G09G 5/363
(Continued)

(56) References Cited

U.S. PATENT DOCUMENTS 5,267,149 A    11/1993   Anada et al.
5,428,417 A     6/1995   Lichtenstein
(Continued)

FOREIGN PATENT DOCUMENTS

EP    0 665 486 A2    8/1995
EP    0 838 768 A2    4/1998
(Continued)

OTHER PUBLICATIONS

Williams, "Java Goes to Work Controlling Networked Embedded Systems," Computer Design, vol. 35, No. 9, pp. 36-37, Aug. 1996.
(Continued)

*Primary Examiner* — Prabodh M Dharia
(74) *Attorney, Agent, or Firm* — Oliff PLC

(57) ABSTRACT

A method includes sending image related working status information representing image-related working status of a projector that projects images, to a client over a network in response to a request to provide the image-related working status of the projector. The image-related working status is related to display characteristic of the projected image. The method includes controlling the image-related working status of the projector based on the control information received from the client over the network in response to the sent image-related working status information. The image-related working status information is sent to the client with screen information from which the client can display a user interface that includes the image-related working status information.

11 Claims, 26 Drawing Sheets

Related U.S. Application Data continuation of application No. 13/762,481, filed on Feb. 8, 2013, now Pat. No. 8,654,109, which is a continuation of application No. 13/067,068, filed on May 5, 2011, now abandoned, which is a continuation of application No. 12/805,092, filed on Jul. 12, 2010, now Pat. No. 7,965,284, which is a continuation of application No. 12/068,333, filed on Feb. 5, 2008, now Pat. No. 7,782,330, which is a continuation of application No. 10/048,055, filed as application No. PCT/JP01/04629 on May 31, 2001, now Pat. No. 7,397,476.

(51) Int. Cl.

| | | |
|---|---|---|
| *G03B 21/14* | (2006.01) | |
| *G06F 3/0486* | (2013.01) | |
| *G06F 3/14* | (2006.01) | |
| *G06F 21/84* | (2013.01) | |
| *G09G 5/36* | (2006.01) | |
| *H04L 29/08* | (2006.01) | |

(52) U.S. Cl.
CPC .......... *G06F 21/84* (2013.01); *G09G 5/363* (2013.01); *H04L 67/02* (2013.01); *H04N 9/3135* (2013.01); *H04N 9/3138* (2013.01); *H04N 9/3197* (2013.01)

(58) Field of Classification Search
USPC ... 345/5, 156, 162, 204–215, 440, 473, 474, 345/533–553; 348/220, 744; 707/100, 707/770; 725/30; 715/732; 709/201
See application file for complete search history.

(56) References Cited

U.S. PATENT DOCUMENTS

| | | | |
|---|---|---|---|
| 5,651,619 A * | 7/1997 | Nunokawa | B41J 3/4075 400/61 |
| 5,668,566 A | 9/1997 | Yen | |
| 5,684,259 A * | 11/1997 | Horii | G10H 1/0008 84/600 |
| 5,745,164 A * | 4/1998 | Faris | G02B 27/26 348/42 |
| 5,751,814 A | 5/1998 | Kafri | |
| 5,782,548 A | 7/1998 | Miyashita | |
| 5,809,678 A * | 9/1998 | Douglas | G09F 13/20 362/34 |
| 5,841,466 A | 11/1998 | Mizoguchi et al. | |
| 5,864,853 A | 1/1999 | Kimura et al. | |
| 5,875,428 A * | 2/1999 | Kurzweil | G09B 5/065 704/260 |
| 5,924,013 A | 7/1999 | Guido et al. | |
| 5,931,948 A | 8/1999 | Morisawa et al. | |
| 5,956,487 A | 9/1999 | Venkatraman et al. | |
| 6,023,506 A | 2/2000 | Ote et al. | |
| 6,055,441 A | 4/2000 | Wieand et al. | |
| 6,064,666 A | 5/2000 | Willner et al. | |
| 6,078,328 A * | 6/2000 | Schumann | G06T 11/60 345/418 |
| 6,087,577 A * | 7/2000 | Yahata | G09B 15/003 84/470 R |
| 6,088,124 A | 7/2000 | Tanaka | |
| 6,108,591 A | 8/2000 | Segal et al. | |
| 6,118,458 A | 9/2000 | Kawai et al. | |
| 6,122,640 A | 9/2000 | Pereira | |
| 6,139,177 A | 10/2000 | Venkatraman et al. | |
| 6,148,403 A | 11/2000 | Haneda et al. | |
| 6,154,757 A * | 11/2000 | Krause | G06F 3/0219 715/205 |
| 6,157,953 A | 12/2000 | Chang et al. | |
| 6,163,316 A | 12/2000 | Killian | |
| 6,184,943 B1 | 2/2001 | Sellers | |
| 6,209,048 B1 | 3/2001 | Wolff | |
| 6,216,158 B1 | 4/2001 | Luo et al. | |
| 6,219,695 B1 | 4/2001 | Guttag et al. | |
| 6,229,561 B1 * | 5/2001 | Son | G02B 27/2214 348/42 |
| 6,253,151 B1 * | 6/2001 | Ohler | G01C 21/32 340/990 |
| 6,359,711 B1 | 3/2002 | Cole et al. | |
| 6,360,011 B1 * | 3/2002 | Katsumata | G06K 9/00449 382/181 |
| 6,437,786 B1 | 8/2002 | Yasukawa | |
| 6,489,936 B1 | 12/2002 | Gormish | |
| 6,499,062 B1 | 12/2002 | Shteyn | |
| 6,501,846 B1 * | 12/2002 | Dickinson | G06F 3/021 345/156 |
| 6,512,838 B1 * | 1/2003 | Rafii | G01C 3/08 348/E3.018 |
| 6,525,746 B1 * | 2/2003 | Lau | G06F 3/0481 375/E7.076 |
| 6,529,910 B1 | 3/2003 | Fleskes | |
| 6,558,002 B1 | 5/2003 | Miyashita | |
| 6,560,637 B1 | 5/2003 | Dunlap et al. | |
| 6,567,546 B1 * | 5/2003 | Eguchi | G06K 9/00449 345/689 |
| 6,593,908 B1 | 7/2003 | Borgstrom et al. | |
| 6,650,778 B1 | 11/2003 | Matsugu et al. | |
| 6,717,591 B1 * | 4/2004 | Fiveash | G06Q 10/10 715/723 |
| 6,735,616 B1 | 5/2004 | Thompson et al. | |
| 6,738,841 B1 | 5/2004 | Wolff | |
| 6,760,045 B1 | 7/2004 | Quinn et al. | |
| 6,804,706 B2 | 10/2004 | Pitts | |
| 6,820,055 B2 | 11/2004 | Saindon et al. | |
| 6,827,454 B2 | 12/2004 | Kimura et al. | |
| 6,847,354 B2 * | 1/2005 | Vranish | G06F 3/044 345/173 |
| 6,860,609 B2 | 3/2005 | Olson et al. | |
| 6,898,476 B2 | 5/2005 | Watanabe et al. | |
| 6,914,605 B2 | 7/2005 | Kishi et al. | |
| 6,925,481 B2 * | 8/2005 | Singhal | H04L 29/06 709/200 |
| 6,944,659 B2 * | 9/2005 | Taggart | H04L 43/026 709/223 |
| 6,983,415 B2 | 1/2006 | Shima | |
| 6,999,113 B1 * | 2/2006 | Omura | G03B 17/02 348/207.2 |
| 7,013,304 B1 | 3/2006 | Schuetze et al. | |
| 7,016,740 B2 | 3/2006 | Nakamura et al. | |
| 7,059,724 B2 | 6/2006 | Miyashita | |
| 7,180,475 B2 | 2/2007 | Slobodin et al. | |
| 7,182,462 B2 | 2/2007 | Castaldi et al. | |
| 7,254,621 B2 * | 8/2007 | Singhal | H04L 29/06 709/217 |
| 7,315,826 B1 | 1/2008 | Guheen et al. | |
| 7,350,923 B2 | 4/2008 | Olson et al. | |
| 7,379,850 B2 | 5/2008 | Sprogis et al. | |
| 7,397,476 B2 | 7/2008 | Akaiwa et al. | |
| 7,782,330 B2 | 8/2010 | Akaiwa et al. | |
| 2001/0007455 A1 * | 7/2001 | Yoo | G11B 27/105 715/856 |
| 2001/0017630 A1 | 8/2001 | Sakashita et al. | |
| 2001/0024205 A1 | 9/2001 | Kishi et al. | |
| 2001/0042014 A1 | 11/2001 | Lowry et al. | |
| 2001/0052083 A1 * | 12/2001 | Willins | H04L 9/32 726/10 |
| 2002/0036694 A1 | 3/2002 | Merril | |
| 2002/0065135 A1 | 5/2002 | Chatani | |
| 2002/0108108 A1 | 8/2002 | Akaiwa et al. | |
| 2002/0120554 A1 | 8/2002 | Vega | |
| 2003/0016253 A1 * | 1/2003 | Aoki | G06F 1/1626 715/863 |
| 2003/0093469 A1 * | 5/2003 | Ohta | G06F 3/14 709/203 |
| 2003/0110217 A1 * | 6/2003 | Raju | H04L 29/06 709/204 |
| 2003/0149601 A1 * | 8/2003 | Cabral | G06Q 10/02 705/5 |

(56) References Cited

U.S. PATENT DOCUMENTS

| | | | |
|---|---|---|---|
| 2004/0015401 A1* | 1/2004 | Lee | G06Q 30/02 705/16 |
| 2004/0024643 A1* | 2/2004 | Pollock | G06Q 30/02 705/16 |
| 2004/0093608 A1 | 5/2004 | Sprogis | |
| 2005/0021608 A1 | 1/2005 | Wolff | |
| 2006/0221093 A1 | 10/2006 | Holub | |
| 2007/0033528 A1 | 2/2007 | Merril et al. | |
| 2008/0222734 A1 | 9/2008 | Redlich et al. | |
| 2013/0229424 A1 | 9/2013 | Slobodin et al. | |
| 2013/0300765 A1 | 11/2013 | Karasawa et al. | |
| 2014/0218380 A1 | 8/2014 | Slobodin et al. | |
| 2015/0112676 A1 | 4/2015 | Merril et al. | |

FOREIGN PATENT DOCUMENTS

| | | |
|---|---|---|
| EP | 0 858 021 A2 | 8/1998 |
| EP | 0 907 120 A2 | 4/1999 |
| EP | 0 917 052 A1 | 5/1999 |
| EP | 0 996 253 A2 | 4/2000 |
| GB | 2 334 868 A | 9/1999 |
| JP | S63242055 A | 10/1988 |
| JP | H03-52371 A | 3/1991 |
| JP | H03269756 A | 12/1991 |
| JP | H05-6065 A | 1/1993 |
| JP | H06-4238 A | 1/1994 |
| JP | H06-28095 A | 2/1994 |
| JP | H06-35807 A | 2/1994 |
| JP | H06253158 A | 9/1994 |
| JP | H06259219 A | 9/1994 |
| JP | H07-93575 A | 4/1995 |
| JP | H08106525 A | 4/1996 |
| JP | H09-26832 A | 1/1997 |
| JP | H09149376 A | 6/1997 |
| JP | H09325925 A | 12/1997 |
| JP | H10105470 A | 4/1998 |
| JP | H10108272 A | 4/1998 |
| JP | H10124418 A | 5/1998 |
| JP | H10191463 A | 7/1998 |
| JP | H10222578 A | 8/1998 |
| JP | H10 290372 A | 10/1998 |
| JP | H10289106 A | 10/1998 |
| JP | H10326288 A | 12/1998 |
| JP | H11-18178 A | 1/1999 |
| JP | H11-75145 A | 3/1999 |
| JP | H11191027 A | 7/1999 |
| JP | H11231259 A | 8/1999 |
| JP | H11296468 A | 10/1999 |
| JP | 2000023149 A | 1/2000 |
| JP | 2000057094 A | 2/2000 |
| JP | 2000076028 A | 3/2000 |
| JP | 2000089739 A | 3/2000 |
| JP | 2000092262 A | 3/2000 |
| JP | 2000115275 A | 4/2000 |
| WO | 97/18636 A2 | 5/1997 |

OTHER PUBLICATIONS

Adobe Acrobat Reader 3.0 "Online Guide" XP-002279424, pp. 46, Sep. 1996.
Jun. 19, 2007 Office Action issued in U.S. Appl. No. 10/048,055.
Nov. 21, 2007 Notice of Allowance issued in U.S. Appl. No. 10/048,055.
Sep. 17, 2009 Office Action issued in U.S. Appl. No. 12/068,333.
Dec. 16, 2009 Notice of Allowance issued in U.S. Appl. No. 12/068,333.
Sep. 27, 2010 Office Action issued in U.S. Appl. No. 12/155,076.
Fox, A. et al., Integrating information appliances into an interactive workspace, Computer Graphics and Applications, IEEE, vol. 20, No. 3, May/Jun. 2000, pp. 54-65, Published Apr. 21, 2000.
Huang A. et al., "Running the Web backwards: appliance data services", Computer Networks, vol. 33, Issues 1-6, pp. 619-631, Feb. 2000.
Kline, D., "The embedded internet", Wired, vol. 4, pp. 98-106, 1996.
Agranat, I.D., "Engineering Web technologies for embedded applications," Internet Computing, IEEE, vol. 2, No. 3, pp. 10-45, May/Jun. 1998.
Want, R. et al., "Survey on information appliances," Computer Graphics and Applications, IEEE, vol. 20, No. 3, May/ Jun. 2000, pp. 24-31, Published Apr. 21, 2000.
Dec. 21, 2010 European Search Report issued in European Patent Application No. 10010692.1.
Dec. 15, 2010 Office Action issued in European Patent Application No. 07 008 179.9.
Jan. 11, 2011 Office Action issued in Japanese Patent Application No. 2007-213215.
Mar. 21, 2011 Office Action issued in U.S. Appl. No. 12/155,076.
Feb. 25, 2011 Notice of Allowance issued in U.S. Appl. No. 12/805,092.
Sep. 22, 2011 Office Action issued in U.S. Appl. No. 12/155,076.
Oct. 4, 2011 Office Action issued in Japanese Patent Application No. 2011-054927.
Jan. 25, 2012 Notice of Allowance issued in U.S. Appl. No. 12/155,076.
Nov. 8, 2012 Office Action issued in U.S. Appl. No. 13/067,068.
Takahashi, "P410DL DLP™ System Video Wall Projector," Toshiba Review, vol. 55, No. 2, pp. 12-16 and 72, 2000.
Oct. 14, 2015 Notice of Allowance issued in U.S. Appl. No. 14/144,993.
Jul. 13, 2015 Office Action issued in U.S. Appl. No. 14/144,993.
Feb. 12, 2015 Office Action issued in U.S. Appl. No. 14/144,991.

* cited by examiner

PROJECTOR, PROJECTION DISPLAY SYSTEM, AND CORRESPONDING METHOD AND RECORDING MEDIUM

CONTINUITY DATA

This is a Division of application Ser. No. 14/144,993, filed Dec. 31, 2013, issued as U.S. Pat. No. 9,270,729 on Feb. 23, 2016, which is a Continuation application of Ser. No. 13/762,481, filed Feb. 8, 2013, issued as U.S. Pat. No. 8,654,109 on Feb. 18, 2014, which is a Continuation of application Ser. No. 13/067,068, filed May 5, 2011, now abandoned, which is a Continuation application of Ser. No. 12/805,092, filed Jul. 12, 2010, issued as U.S. Pat. No. 7,965,284 on Jun. 21, 2011, which is a Continuation of application Ser. No. 12/068,333, filed Feb. 5, 2008, issued as U.S. Pat. No. 7,782,330 on Aug. 24, 2010, which is a Continuation of application Ser. No. 10/048,055, filed Jan. 25, 2002, now U.S. Pat. No. 7,397,476, on Jul. 8, 2008, which in turn is a National Stage Application of PCT/JP01/04629, filed May 31, 2001. This application claims the benefit of Japanese Patent Application Nos. 2000-161876, filed May 31, 2000; 2000-175849, filed Jun. 12, 2000; and 2000-175868, filed Jun. 12, 2000. The disclosures of the prior applications are hereby incorporated by reference herein in their entirety.

TECHNICAL FIELD

The present invention relates to a projection-type display apparatus or a projector connectable with a network, a method of displaying images via the network, and control of the operating conditions of the projector via the network.

BACKGROUND ART

The projector-type display apparatus or the projector is, for example, connected to an image generation apparatus, such as a personal computer, via a video cable and is used for presentations and other purposes. Analog RGB signals generated by the personal computer are input into the projector via the video cable and are projected as images on a screen or the like.

Under such working conditions, the personal computer simply exerts the function of outputting video signals to the projector. The work of connecting the personal computer with the projector via the video cable on every occasion of use is rather troublesome and time-consuming.

It is accordingly convenient to store data for the presentation in the projector. Under the recent development of the network environment, it is further convenient to distribute display video data to the projector via the network. In the structure of storing the presentation data in the projector, some protection policy is desired to prevent the stored data from being displayed by any third entity.

The projector for projecting and displaying images is capable of large screen display and is thus widely used in lectures, meetings, and school lessons. The projector is generally combined with a computer, which functions as an image supply apparatus to the projector and also as a control apparatus for controlling the working state of the projector, to constitute a display system. The computer as the control apparatus is conventionally connected with the projector via an interface like RS-232C and carries out various control operations to control the projector.

The user's control of the working state of the projector is implemented by execution of a specific software program by the computer. Otherwise the working state of the projector may be controlled with a remote control attached to the projector.

When there is a requirement to change the working state of the projector in the middle of a meeting, for example, an operator who operates the control apparatus generally carries out the change. When one of multiple participants, for example, in the meeting desires to change the working state of the projector, the participant should request the operator to change the working state of the projector.

In the case of changing the working state of the projector according to this procedure, there is a possibility that the request of change is not smoothly transferred from the participant to the operator. If the participant desires to directly operate the control apparatus, the participant should move to the position where the control apparatus is located. Because of these factors, the display system utilizing the prior art projector has poor operatability.

The user operates a remote control RM and causes a projector PJZ to carry out diverse processing as shown in FIG. 30. The projector PJZ projects and displays an image on a screen SC, in response to an analog video signal AV1 supplied from an image supply apparatus 1900. The user operates, for example, the remote control RM to superimpose an ornamental image like a pointer image PPJ on an original image ORG projected and displayed on the screen SC. Such superimposition of the ornamental image on the original image ORG enhances the effects of the presentation.

There are, however, difficulties in causing the projector PJZ to execute the processing with regard to the contents of the projected and displayed image through the operation of the remote control RM. This is ascribed to the rather poor operatability of the remote control RM. In the case of sequential presentations by a plurality of people with one projector, it is required to successively transfer the remote control RM among the respective presenters. This prevents smooth progress of the sequential presentations.

DISCLOSURE OF THE INVENTION

The object of the present invention is thus to solve the above drawbacks and actualize the above requirements and to allow storage of data in a projector while keeping secrecy of the data. The object of the invention is also to project and display the stored data while keeping secrecy of the data.

In order to attain at least part of the above objects, a first application of the present invention is an image display system, in which a computer and an image display apparatus including a storage device are connected with each other via a network. In the image display system according to the first application of the present invention, the computer includes: an input unit that is used to input at least one of data and a command; a data storage module that stores therein display data to be displayed by the image display apparatus; a password setting requirement module that requires setting of a password in the process of transferring desired data from the data storage module to the storage device of the image display apparatus; and a data transfer module that, when a password is set via the input unit, maps the preset password to the desired data and transfers the desired data with the password to the storage device of the image display apparatus. The image display apparatus includes: a data receiving module that stores the transferred desired data with the password into the storage device; an input unit that is used to input at least one of data and a command; an authentication module that, in response to selection of desired display data among data stored in the storage device, requires input of a password via the input unit and determines whether or not the input password is coincident with the preset password; and a projection display module that allows the selected display data to be projected and displayed when it is determined that the two passwords are coincident with each other.

In the image display system according to the first application of the present invention, setting of a password is required in the process of transferring data from the computer to the storage device of the image display apparatus. Data mapped to the preset password is then transferred to the storage device of the image display apparatus. In the image display apparatus, in response to selection of display data among plural data stored in the storage device, the technique requires input of a password and enables display data to be projected and displayed when the input password is coincident with the preset password. This arrangement desirably ensures secrecy of data stored in the storage device of the image display apparatus. This arrangement enables display of data while keeping secrecy of data, when the displayed data is stored in the storage device of the image display apparatus.

In the image display system according to the first application of the present invention, the data transfer module of the computer may transfer only the desired data to the storage device of the image display apparatus, when no password is set via the input unit. This arrangement allows transfer of data without setting a password. The projection display module of the image display apparatus may project and display a projection display forbid window representing failed authentication, when it is determined that the two passwords are not coincident with each other. This arrangement informs the user of a wrong input or a wrong selection.

In accordance with one preferable embodiment of the image display system according to the first application of the present invention, the computer further has a display screen, on which a list of data stored in the data storage module and an icon representing the image display apparatus are displayed, and the password setting requirement module requires setting of a password, when the desired data selected out of the list of storage data is dragged and dropped onto the icon of the image display apparatus on the display screen. This arrangement enables the transfer of data from the computer to the storage device of the image display apparatus to be visually observed, thus facilitating the operation.

The image display system according to the first application of the present invention may further include a file server connecting with the network. When a password is set via the input unit, the data transfer module of the computer maps the preset password to the desired data and transfers the desired data with the password to the file server. This arrangement assures storage of a large mass of data, which can not be stored in the storage device of the image display apparatus.

A second application of the present invention is a method of storing data to be displayed with a projector via a computer. The method includes the steps of: specifying data to be displayed; determining whether or not a requirement of storing the specified data into a storage device is output; when it is determined that the storing requirement is output, requiring setting of a password; mapping the preset password to the specified data; and transferring the data with the password to the storage device.

The data storage method according to the second application of the present invention requires setting of a password and transfers data with the preset password mapped thereto to the storage device for storage. This arrangement ensures secrecy of data stored in the storage device.

In one preferable embodiment of the data storage method according to the second application of the present invention, it is determined that the requirement of storing the specified data into the storage device is output, when an icon representing the specified data is dragged and dropped onto an icon representing the storage device on a display screen of the computer. This arrangement maps a general drag and drop operation of a data icon onto an icon of the storage device on the display screen to the requirement of setting a password, thus urging the user to set a password without any specific operation.

In the data storage method according to the second application of the present invention, the storage device may be incorporated in the projector or may be incorporated in a file server, which is connected with the projector and the computer via a network. The incorporation of the storage device in the projection display apparatus enables stored data to be displayed by the projection display apparatus alone. The incorporation of the storage device in the file server ensures storage of a large mass of data.

A third application of the present invention is a method of causing display data including display data mapped to a password with an image display apparatus. The method includes the steps of: specifying desired display data to be displayed, among a plurality of display data; determining whether or not the specified display data is mapped to a password; when it is determined that the specified display data is mapped to a password, requiring input of a password, which is expected to be assigned to the specified display data; determining whether or not the input password is coincident with the password mapped to the specified display data; and allowing the display data to be displayed, when it is determined that the input password is coincident with the password mapped to the specified display data.

In the third application of the present invention, the method requires input of a password in response to a display requirement of display data mapped to a password and enables the display data to be displayed when the input password is coincident with the mapped password. Namely the image display apparatus does not allow the display of the display data unless the input password is coincident with the mapped password. This arrangement desirably ensures secrecy of display data.

The method according to the third application of the present invention may further include the step of showing prohibition of display of the display data, when it is determined the input password is not coincident with the password mapped to the specified display data. This arrangement informs the user of a wrong input or wrong selection.

A fourth application of the present invention is an image display apparatus having a function of data protection. The image display apparatus according to the fourth application of the present invention includes: an input unit that is used to input at least one of data and a command; a display data storage module that stores display data including display data mapped to a password; a password requirement module that requires input of a password, in response to a display requirement for displaying the display data mapped to the password; an authentication module that determines whether or not a password input via the input unit is coincident with the password mapped to the display data; and a projection display module that allows the required display data to be projected and displayed, when it is determined that the two passwords are coincident with each other.

In the fourth application of the present invention, the technique requires input of a password in response to a display requirement of display data that is mapped to a password and stored in the display data storage module and enables the display data to be projected and displayed when the input password is coincident with the mapped password. Namely the image display apparatus does not allow the projection and display of the display data unless the input password is coincident with the mapped password. This arrangement desirably ensures secrecy of display data stored in the display data storage module of the image display apparatus.

A fifth application of the present invention is an image display apparatus having a storage device in which display data is stored. The image display apparatus according to the fifth application of the present invention includes: an input unit that is used to input at least one of data and a command; a data list display module that displays a list of data stored in the storage device; a password input window display module that, in response to selection of data out of the data list, displays an input window of a password assigned to the selected data; an authentication module that determines whether or not the password input via the input unit is coincident with a preset password mapped to the selected data; and a projection display module that allows the selected data to be projected and displayed, when it is determined that the input password is coincident with the preset password.

In the fifth application of the present invention, the technique displays a password input window in response to selection of desired data out of a list of data and enables the selected data to be projected and displayed when the input password is coincident with a preset password. Namely the image display apparatus does not allow the projection and display of the selected data unless the input password is coincident with the preset password. This arrangement desirably ensures secrecy of data stored in the storage device of the image display apparatus.

The image display apparatus according to the fifth application of the present invention may further include a forbid window display module that displays a projection display forbid window representing failed authentication, when the input password is not coincident with the preset password.

A sixth application of the present invention is a computer readable medium, in which a program executed on a computer for storing data to be displayed with a projector is stored. The program causes the computer to attain the functions of: specifying data to be displayed; determining whether or not a requirement of storing the specified data into a storage device is output; when it is determined that the storing requirement is output, requiring setting of a password; mapping the preset password to the specified data; and transferring the data with the password to the storage device.

The technique according to the sixth application of the present invention requires setting of a password in the process of storing data in the storage device and transfers and stores the data mapped to the preset password to and in the storage device. This arrangement desirably keeps the secrecy of data stored in the storage device.

A seventh application of the present invention is a computer readable medium, in which a program for allowing display data mapped to a password to be displayed on an image display apparatus. The program causes the computer to attain the functions of: specifying desired display data to be displayed, among a plurality of display data; determining whether or not the specified display data is mapped to a password; when it is determined that the specified display data is mapped to a password, requiring input of a password, which is expected to be assigned to the specified display data; determining whether or not the input password is coincident with the password mapped to the specified display data; and allowing the display data to be displayed, when it is determined that the input password is coincident with the password mapped to the specified display data.

In the seventh application of the present invention, a password is assigned to the specified display data among multiple display data. The method requires input of a password and displays the specified display data when the input password is coincident with the assigned password. Each of the plural display data is protected by the assigned password. The display data is not displayed unless the input password is coincident with the assigned password.

The object of the present invention is also to solve the drawbacks of the prior art technique discussed above and to enhance the operatability of controlling the working state of a projector.

In order to attain at least part of the above object, an eighth application of the present invention is a projector connectable with a network. The projector according to the eighth application of the present invention includes: a projection display module that causes an image to be projected and displayed; and a Web server module that is capable of distributing Web page information, which includes working status information representing a working status of the projection display module. The Web server module has: a page information distribution module that distributes the Web page information, which includes the working status information representing the working status of the projection display module, to a Web client in response to a requirement from the Web client; a control signal supply module that supplies a control signal for controlling the working status of the projection display module to the projection display module, according to control information input on a Web page distributed to and displayed on the Web client and sent back; and a page information update module that fetches new working status information representing a new working status of the projection display module controlled by the control signal and updates the Web page information distributed to the Web client.

In the projector according to the eighth application of the present invention, the working state of the projection display module is controlled according to the control information input on the Web page distributed to the Web client (also referred to as the Web browser). This arrangement ensures easy control of the working state of the projector via the network and thus enhances the operatability of controlling the working state of the projector, compared with the prior art technique.

Here it is preferable that the Web page includes a button operated to change the working status of the projector, and a press of the button causes the control information to be transmitted to the projector.

The user can readily change the working state of the projector by simply clicking the button on the Web page displayed on the Web client.

The eighth application of the present invention may be actualized by diverse embodiments, for example, a method of controlling the working state of the projector, a computer program to attain the method or the functions of a corresponding apparatus, a recording medium in which such a computer program is recorded, and a data signal that includes such a computer program and is embodied in a carrier wave.

The object of the present invention is also to solve the drawbacks of the prior art technique discussed above and to provide a technique in which the user enables a projector to readily execute a series of processing with regard to the contents of a projected and displayed image.

In order to attain at least part of the above object, a ninth application of the present invention is a projector connecting with an external input apparatus having an input unit via a network. The projector according to the ninth application of the present invention includes: a network interface module that connects with the network; a video data generation module that executes a predetermined series of processing with regard to contents of an image to be projected and displayed and generates video data representing the image to be projected and displayed, based on operation information generated through an operation of the input unit of the eternal input device and supplied to the network interface module via the network; an electro-optic device that generates an image ray according to the video data; and a projection optical system that projects the image ray generated by the electro-optic device.

In the projector according to the ninth application of the present invention, the series of processing with regard to the contents of the projected and displayed image is carried out to generate the video data, based on the operation information supplied via the network interface module. The user accordingly enables the projector to readily execute the series of processing with regard to the contents of the projected and displayed image by a simple operation of the input unit incorporated in the external input apparatus.

Connection of multiple external input apparatuses to the network ensures the smooth progress of sequential presentations, which are made by a plurality of people with one projector.

In one preferable embodiment of the projector according to the ninth application of the present invention, the image to be projected and displayed includes an original image and an ornamental image superimposed on the original image, ornamental video data representing the ornamental image is not supplied from the external input apparatus but is prepared by the video data generation module, and the video data generation module combines original video data representing the original image with the ornamental video data to generate the video data, based on the operation information supplied from the external storage device, thereby superimposing the ornamental image at a predetermined position on the original image.

The user operates the input unit incorporated in the external input apparatus to superimpose the ornamental image on the projected and displayed original image.

In the projector according to the ninth application of the present invention, it is preferable that the operation information includes at least positional information, which is generated through an operation of a pointing device used as the input unit of the external input apparatus, and the video data generation module superimposes a pointer image as the ornamental image at the predetermined position on the original image, based on the positional information.

In this arrangement, the user can readily move the pointer image superimposed on the projected and displayed original image by a simple movement of the pointing device incorporated in the external input apparatus.

In the projector according to the ninth application of the present invention, it is also preferable that the positional information includes coordinate value information specified by the pointing device.

This arrangement enables the position specified by the pointing device to be readily mapped to the position of the pointer image superimposed on the projected and displayed original image.

In one preferable embodiment of the projector according to the ninth application of the present invention, the operation information further includes switch information generated through an operation of a switch mounted on the pointing device, and the video data generation module superimposes an ornamental image, which is different from the pointer image, in a specified area on the original image, based on the positional information and the switch information included in the operation information.

The operation information including the positional information and the switch information can specify the specific area in the original image. This allows an ornamental image, which is different from the pointer image, to be superimposed in the specified area.

In another preferable embodiment of the projector according to the ninth application of the present invention, the operation information further includes key information generated through an operation of a keyboard as the input device of the external input apparatus, and the video data generation module superimposes a symbol image as the ornamental image on the original image, based on the key information.

In this arrangement, a symbol image like letters is readily superimposed on the projected and displayed original image by a simple user's operation of the keyboard incorporated in the external input apparatus.

A tenth application of the present invention is a projection display system including an external input apparatus and a projector connecting with each other via a network. In the projection display system according to the tenth application of the present invention, the external input apparatus includes: an input unit; an operation information generation module that detects a user's operation of the input unit and generates operation information based on a result of the detection; and a first network interface module that connects with the network and supplies the operation information to the projector via the network. The projector includes: a second network interface module that connects with the network; a video data generation module that executes a predetermined series of processing with regard to contents of an image to be projected and displayed and generates video data representing the image to be projected and displayed, based on the operation information supplied to the second network interface module via the network; an electro-optic device that generates an image ray according to the video data; and a projection optical system that projects the image ray generated by the electro-optic device.

The projection display system according to the tenth application of the present invention includes the projector according to the ninth application of the present invention and thus exerts the similar functions and effects to those of the projector. The user enables the projector to readily carry out a series of processing with regard to the contents of a projected and displayed original image by a simple operation of the input unit incorporated in the external input apparatus.

In one preferable embodiment of the projection display system according to the tenth application of the present invention, the external input apparatus further has a display unit, and the operation information generation module causes an operation information generation area, in which the operation information is generated in response to the operation of the pointing device, to be displayed on the display unit, and detects the operation of the pointing device only when a pointer image corresponding to the pointing device is present in the operation information generation area.

In this arrangement, the operation information is generated only when the pointer image is present in the operation information generation area. While the pointer image is located out of the operation information generation area, the user can implement another operation with the pointing device.

In the projection display system according to the tenth application of the present invention, it is preferable that the operation information generation area is mapped to an image area to be projected and displayed.

This arrangement enables the positional relation of the pointer image in the operation information generation area to be substantially coincident with the positional relation of the pointer image in the projected and displayed image area.

An eleventh application of the present invention is a method of generating operation information that is generated through an operation of an input unit included in an external input apparatus and is supplied to a projector, which is connected to the external input apparatus via a network. The method includes the steps of: (a) detecting a user's operation of the input unit; and (b) generating the operation information, based on a result of the detection.

In this arrangement, the user operates the input unit included in the external input apparatus to generate the operation information. Supply of the operation information to the projector enables the projector to readily execute a predetermined series of processing with regard to the contents of a projected and displayed image.

In one preferable embodiment of the method according to the eleventh application of the present invention, the step (a) includes the steps of: (a-1) causing an operation information generation area, in which the operation information is generated in response to an operation of a pointing device as the input unit, to be displayed on a display unit incorporated in the external input apparatus; and (a-2) detecting the operation of the pointing device only when a pointer image corresponding to the pointing device is present in the operation information generation area.

In this arrangement, the operation information is generated only when the pointer image is present in the operation information generation area. While the pointer image is located out of the operation information generation area, the user can perform another operation with the pointing device.

A twelfth application of the present invention is a computer readable recording medium in which a computer program is recorded, where the computer program generates operation information that is generated through an operation of an input unit incorporated in an external input apparatus and is supplied to a projector, which is connected to the external input apparatus via a network. The computer program causes a computer to attain the functions of: detecting a user's operation of the input unit; and generating the operation information, based on a result of the detection.

Like the method of the present invention discussed above, when the external input apparatus executes the computer program recorded in the recording medium, the user can generate the operation information through an operation of the input unit incorporated in the external input apparatus. Supply of the operation information to the projector enables the projector to readily execute a predetermined series of processing with regard to the contents of a projected and displayed image.

The ninth through the twelfth applications of the present invention may be actualized by diverse embodiments, for example, computer programs to attain the functions of the projector or the projection display system, recording media in which such computer programs are recorded, and data signals that include such computer programs and are embodied in carrier waves.

BEST MODES OF CARRYING OUT THE INVENTION

First Embodiment

A projector having security functions and an image display system constructed through connection of the projector with a network are discussed below as a first embodiment of the present invention with reference to the drawings.

A. Construction of Projector in First Embodiment

Figure 1:
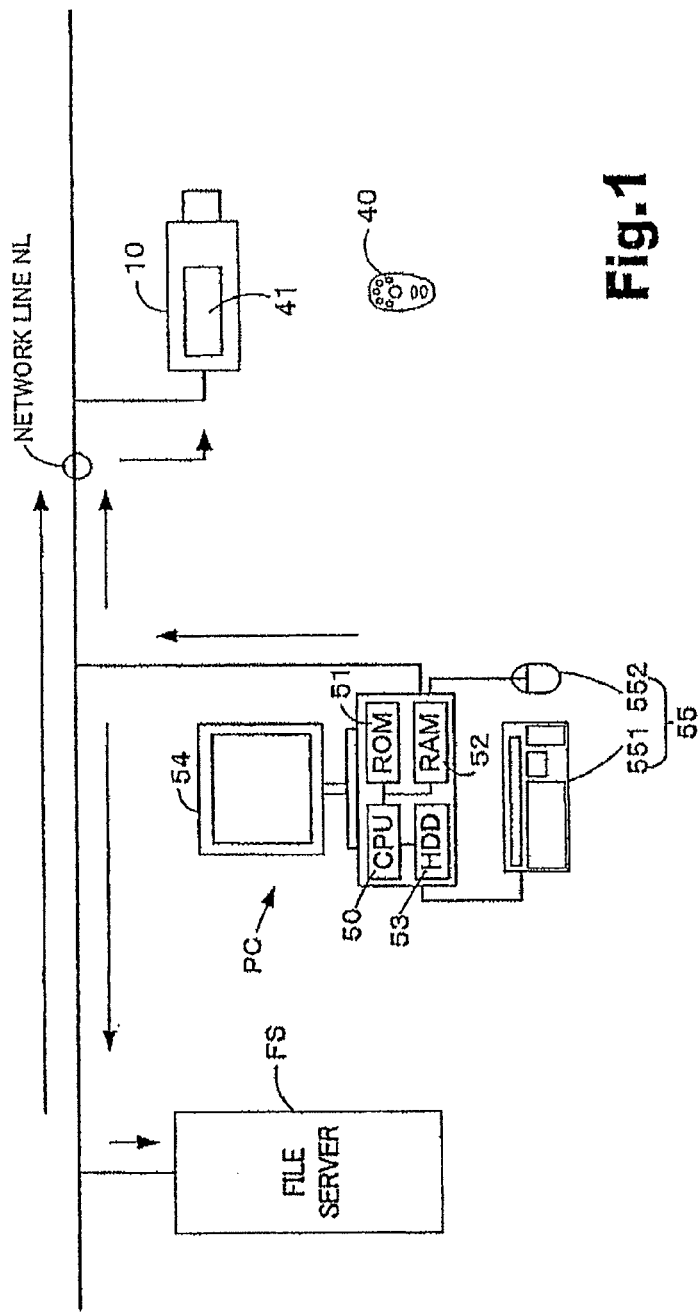
FIG. 1 shows the configuration of an image display system constructed through connection of a projector with a network in a first embodiment.
Figure 2:
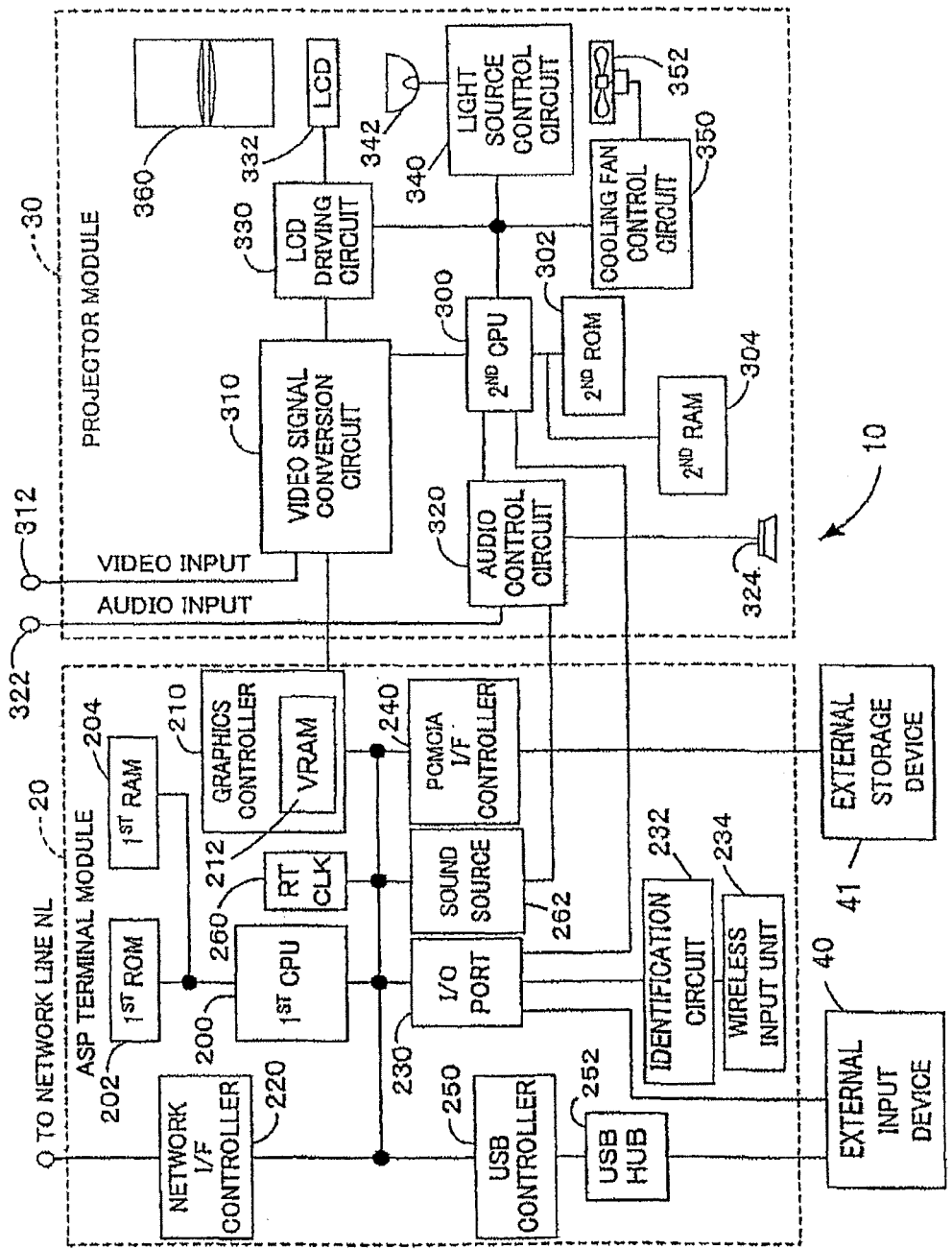
FIG. 2 is a block diagram showing the internal circuit structure of the projector in the first embodiment.

The following describes the schematic structure of a projection-type display apparatus or a projector in the first embodiment with referring to FIGS. 1 and 2. FIG. 1 shows the configuration of an image display system constructed through connection of the projector with a network in the first embodiment. FIG. 2 is a block diagram showing the internal circuit structure of the projector in the first embodiment.

A projector 10 is connected to a file server FS and a personal computer (computer) PC via a network line NL. The personal computer PC includes a CPU 50 that executes application programs, a ROM 51 that stores therein the application programs, and a RAM 52 that temporarily registers the contents of processing under execution of the application programs. The personal computer PC also has an internal hard disk drive (HDD) 53 that stores therein data (display data, files) generated by the application programs after conclusion of the application programs and a display 54 that displays user interfaces of the application programs. The display data stored in the HDD 53 of the personal computer PC are transferred to either the projector 10 or the file server FS according to a procedure discussed later. Commands and data are input into the personal computer PC through an external wireless input device 55 like a keyboard 551 and a mouse 552.

The projector 10 has an external storage device 41, for example, a memory card in conformity to the PCMCIA standard, in which the display data transferred from the personal computer PC are stored. Commands and data are input into the projector 10 through an external input device 40 like a remote control. The file server FS functions to store the display data in place of the projector 10. For reproduction (projection)) of display data, when the projector 10 requires the file server FS to transfer the display data, the required display data are transferred from the file server FS to the projector 10 via the network line NL.

The internal structure of the projector 10 of the first embodiment is discussed with reference to FIG. 2. The projector 10 has an ASP terminal module 20 mainly exerting functions of an ASP terminal and a projector module 30 mainly exerting conventional projector functions. The projector 10 of the first embodiment accordingly functions as an ASP terminal.

The ASP terminal module 20 includes a first central processing unit (CPU) 200 that executes viewer applications, ASP client applications, and other diverse operations, a first read only memory (ROM) 202 that stores therein a variety of programs including the viewer applications and the client applications executed by the first CPU 200, and a first random access memory (RAM) 204 that temporarily registers therein the results of the operations by the first CPU 200 and data. An authentication program, which is executed before reproduction (projection display) of display data, is also stored in the first ROM 202. The first CPU 200 and the first ROM 202 are connected with each other to allow one-way or two-way communication. The first CPU 200 and the first RAM 204 are connected with each other to allow two-way communication.

The ASP terminal module 20 has a graphics controller 210, which is connected with the first CPU 200 to allow two-way communication and generates video data in response to a drawing instruction output from the first CPU 200. The graphics controller 210 has an LSI chip (not shown) for generating images and a video memory or a first frame memory (VRAM) 212 for storing the generated images (display images) therein.

The ASP terminal module 20 is provided with a network interface controller 220, an I/O port 230, a PCMCIA interface controller 240, and a USB controller 250, which function as interfaces used for transmission of commands and data between the projector 10 and external devices. The network interface controller 220 is, for example, in conformity to the Ethernet standard and converts the commands and data to be transmitted from the ASP terminal module 20 to the network line NL into an adequate format according to a protocol of network communication, while converting the signals received from the network line NL into a format suitable for the processing executed in the ASP terminal module 20. The I/O port is a general input-output port and is connected with a wireless input unit 234 via an identification circuit 232 and with the external input device 40 and a second CPU 300 in the projector module 30. The wireless input unit 234 receives input data wirelessly transmitted from a wireless input device. The identification unit 232 identifies the input data received by the wireless input unit 234 as input data addressed to the ASP terminal module 20.

The PCMCIA interface controller 240 transfers data from the ASP terminal module 20 to an external device and inversely from the external device to the ASP terminal module 20 according to the PCMCIA standard. In this embodiment, for example, a PC memory card is connected as the external storage device 41, and the display data transferred from the personal computer PC are stored in the external storage device 41. The USB controller 250 takes charge of transmission of data between the ASP terminal module 20 and the external device according to the USB standard, and is connected with the external input device 40, for example, via a USBHUB 252.

The ASP terminal module 20 is further connected with a real time clock 260 that supplies the absolute time in the ASP terminal module 20 and with a sound source 262 that generates audio data in response to an instruction output from the first CPU 200.

The first CPU 200 and the respective controllers like 210 are mutually connected via a bus for transmitting data and commands in the ASP terminal module 20.

The structure of the projector module 30 is discussed below. The projector module 30 includes a second central processing unit (CPU) 300 that executes predetermined programs to control respective circuits in the projector module 30, a second read only memory (ROM) 302 that stores therein the programs executed by the second CPU 300, and a second random access memory (RAM) 304 that temporarily registers therein the results of operations by the second CPU 300 and data. The second CPU 300 and the second ROM 302 are connected with each other to allow one-way or two-way communication. The second CPU 300 and the second RAM 304 are connected with each other to allow two-way communication. The second CPU 300 and the first CPU 200 are communicated with each other via the I/P port 230 to allow two-way communication, so that data and commands are transmittable between the first CPU 200 and the second CPU 300.

The projector module 30 is further provided with a video signal conversion circuit 310, an audio control circuit 320, a liquid crystal (LCD) driving circuit 330, a light source driving circuit 340, a cooling fan control circuit 350, and a projection optical system 360.

The video signal conversion circuit 310 exerts analog-to-digital conversion, decoding, synchronizing signal separation, and image processing functions. More concretely, the video signal conversion circuit 310 converts analog video signals input from an external video signal input terminal 312 into digital video data, and writes the converted digital video data into a non-illustrated frame memory included in the video signal conversion circuit 310 or reads the digital video data, which has been written previously into the frame memory, from the frame memory in synchronism with a synchronizing signal. Typical examples of the input analog video signals include RGB signals output from the personal computer and composite video signals output from a video cassette recorder. In the case where the input analog video signal is a composite video signal, the video signal conversion circuit 310 demodulates the composite video signal, separates a component video signal consisting of three color signal components RGB from a synchronizing signal included in the composite video signal, and converts the component video signal into digital video data. In the case where the input analog video signal is an RGB signal output from the personal computer, on the other hand, the synchronizing signal separation is not required since the RGB signal is input as a component video signal separately from the synchronizing signal. The video signal conversion circuit 310 thus simply converts the component video signal into digital video data.

The video signal conversion circuit 310 also receives digital video signals transmitted from the graphics controller 210 in the ASP terminal module 20. Neither the analog-to-digital conversion nor the synchronizing signal separation is required since the digital video signal is input separately from the synchronizing signal.

The audio control circuit 320 is connected with an external audio signal input terminal 322, a speaker 324, the second CPU 300, and the sound source 262 in the ASP terminal module 20. The audio control circuit 320 connecting with the second CPU 300 drives the speaker 324 with a driving signal, which is generated based on an audio signal or sound data transferred from the external audio signal input terminal 322 or the sound source 262, in response to an instruction output from the second CPU 300.

The LCD driving circuit 330 receives video data processed by the video signal conversion circuit 310 and drives an LCD 332 according to the input video data to modulate light emitted from a light source 342. The light modulated by the LCD 332 is projected on a projection plane, for example, on a projection screen, via the projection optical system 360 including lenses. The light source 342 is connected with the light source control circuit 340, which controls on and off the light source 342 in response to an instruction output from the second CPU 300. A cooling fan 352 is disposed behind the light source 342 to blast the cooling air against the light source 342. The cooling fan 352 is connected with the cooling fan control circuit 350, which regulates the revolving speed of the cooling fan 352 in response to an instruction output from the second CPU 300.

It is desirable that the ASP terminal module 20 is mounted, for example, on one printed wiring board to allow arbitrary attachment to and detachment from the projector. As clearly understood from the structure of FIG. 2, this projector is capable of projecting and displaying images in response to externally supplied video signals even in the non-attachment state of the ASP terminal module 20. The arbitrary attachment and detachment of the ASP terminal module 20 to and from the projector facilitates construction of both a projector with the functions of the ASP terminal module 20 (that is, the ASP terminal functions and drawing functions discussed later) and a projector without the functions of the ASP terminal module 20.

B. Basic Operations of Projector in First Embodiment

The following describes the basic operations of the projector 10 having the above construction with reference to FIGS. 1 and 2.

A signal input into the projector 10 via the network line NL is converted into a specific format suitable for the ASP terminal module 20 by the network interface controller 220 of the ASP terminal module 20, and is transferred as data and a command to the first CPU 200. The first CPU 200 temporarily registers the transferred data into the first RAM 204 and determines whether the transferred command is a command addressed to the ASP terminal module 20 or a command addressed to the projector module 30. When the transferred command is a command addressed to the projector module 30, the first CPU 200 further transfers the command to the second CPU 300 in the projector module 30 via the I/O port 230.

When the transferred command is a command addressed to the ASP terminal module 20, on the other hand, the first CPU 200 carries out an operation based on the transferred command. For example, the first CPU 200 stores the data, which has temporarily been registered in the first RAM 204, into the external storage device 41. In another example, the first CPU 200 carries out an authentication program, which will be discussed later, in response to a requirement of reproducing (a requirement of projecting and displaying) the data stored in the external storage device 41, which is input through the remote control 40. In order to read (reproduce) the data stored in either the external storage device 41 or the first RAM 204, the first CPU 200 reads and activates an adequate viewer application from the first ROM 202 to generate user interface data of the stored data and transfers the user interface data together with a drawing command to the graphics controller 210.

In still another example, when the projector 10 functions as a client of server base computing (SBC), the first CPU 200 activates a corresponding client application and transmits a drawing command to the graphics controller 210 to generate user interface video data from input display video data having a specific format. The graphics controller 210 generates the user interface video data (hereinafter simply referred to as the 'video data') to be displayed based on the user interface data or the display video data in response to the input drawing command, and stores the generated video data into the VRAM 212 included in the graphics controller 210.

In response to an instruction output from the first CPU 200, the graphics controller 210 reads the video data from the VRAM 212 of the graphics controller 210 at a preset timing and transfers the video data to the video signal conversion circuit 310 of the projector module 30. The first CPU 200 receives a command or data from the external input device 40 via the USBHUB 252, the USB controller 250, and the I/O port 230. The first CPU 200 may write the data stored in the first RAM 204 or the video data stored in the VRAM 212 of the graphics controller 210 via the PCMCIA interface controller 240 into the external storage device 41, in response to a command input from the external input device 40 or via the network line NL.

When receiving video data from the graphics controller 210, the video signal conversion circuit 310 carries out the series of processing discussed above and transfers the processed video data to the LCD driving circuit 330. The LCD driving circuit 330 drives and controls the LCD 332 based on the input video data, and causes desired video data to be projected on the projection screen.

When the command transferred from the network line NL via the I/O port 230 represents an ON instruction of the light source 342, the second CPU 300 turns the light source 342 ON via the light source control circuit 340. The second CPU 300 regulates the working conditions (for example, the rotational speed and the rotational timing) of the cooling fan 352 according to the temperature of the light source 342 via the cooling fan control circuit 350.

The data transmission from the projector 10 to the network line NL is carried out via the network interface controller 220, in response to an instruction output from the first CPU 200.

Figure 3:
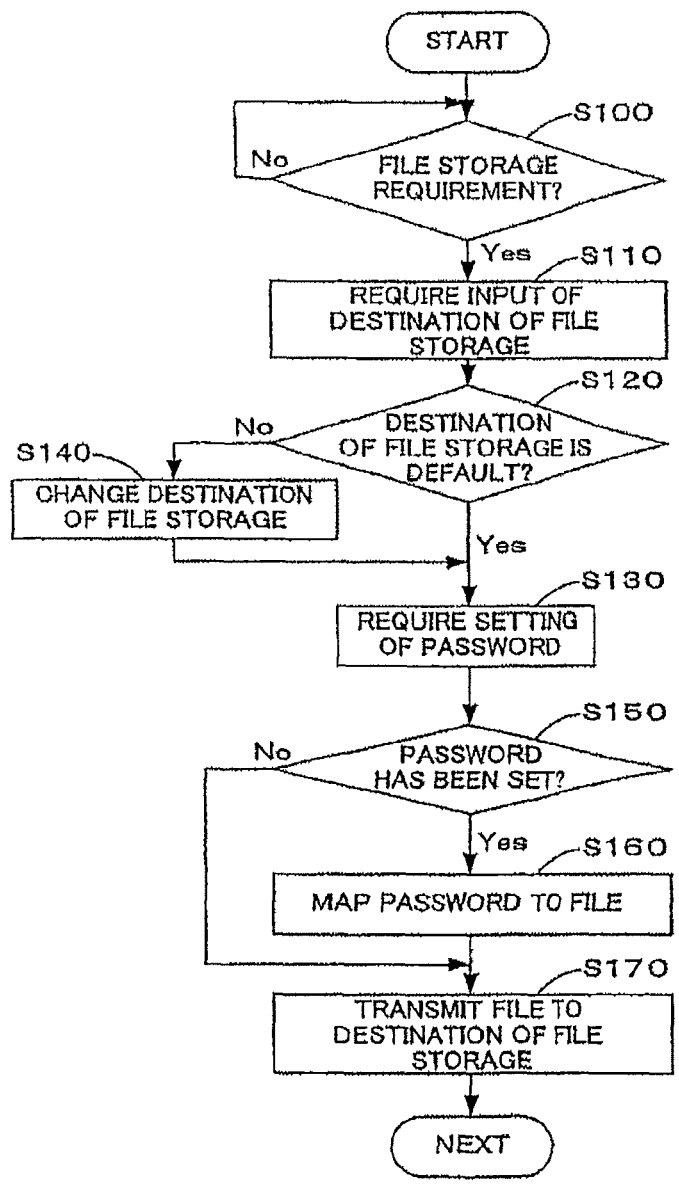
FIG. 3 is a flowchart showing a processing routine executed to transfer display data from a personal computer PC to the projector 10.
Figure 4:
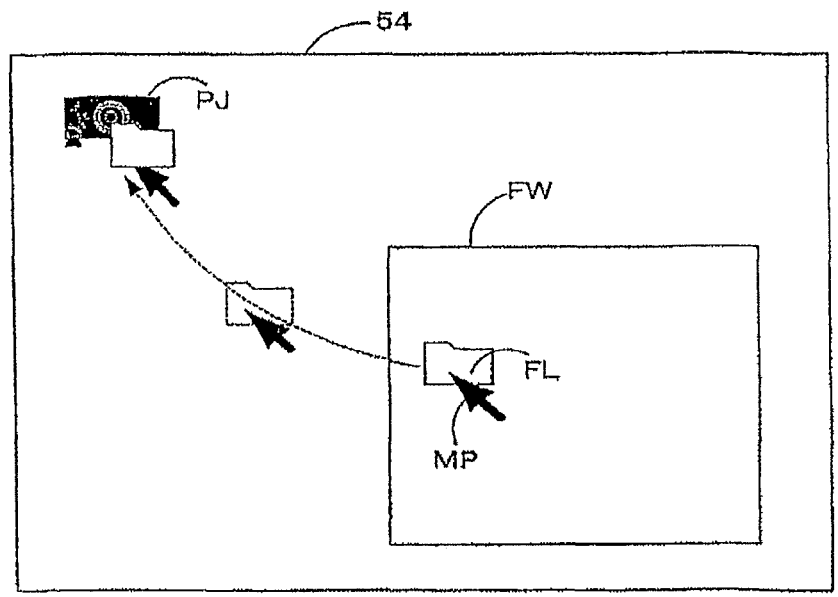
FIG. 4 shows a series of processing carried out on a display 54 of the personal computer PC to transfer the display data from the personal computer PC to the projector 10.
Figure 5:
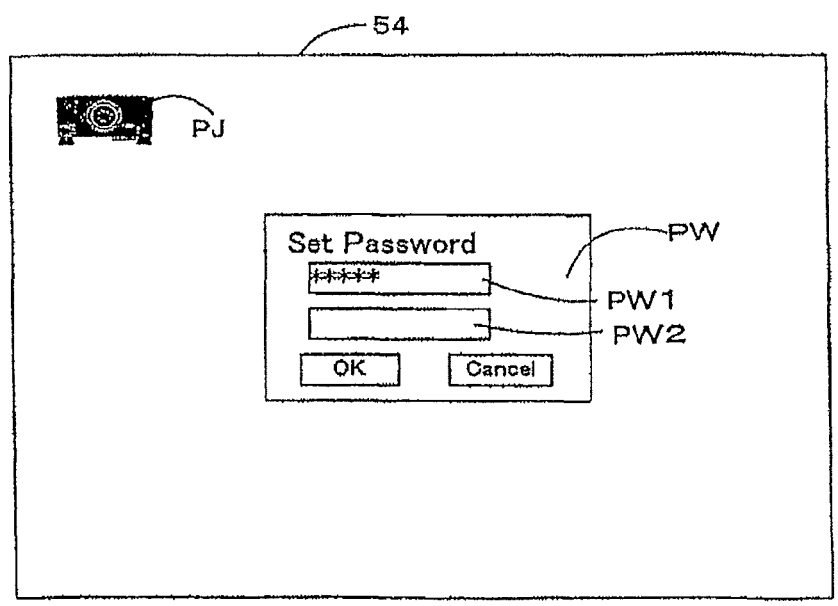
FIG. 5 shows an example of a password setting window open on the display 54 after conclusion of the processing shown in FIG. 4.

C. Process of Storing Display Data into Projector and Process of Displaying Display Data with Projector in First Embodiment The following describes a series of processing executed to transfer display data (file) from the personal computer PC to the projector 10 of the above construction via the network with referring to FIGS. 1 and 3 to 5. FIG. 3 is a flowchart showing a processing routine executed to transfer the display data from the personal computer PC to the projector 10. FIG. 4 shows a series of processing carried out on the display 54 of the personal computer PC to transfer the display data from the personal computer PC to the projector 10. FIG. 5 shows an example of a password setting window open on the display 54 after conclusion of the processing shown in FIG. 4.

Data like presentation data and word processor data generated by execution of an application program on the personal computer PC are temporarily registered in the RAM 52 of the personal computer PC during execution of the application program. On conclusion of the application program, the data are stored in the form of a data file in the internal HDD 53 of the personal computer PC. Multiple data files including those generated in the past are accordingly stored in the HDD 53.

In the processing routine shown in FIG. 3, the CPU 50 of the personal computer PC waits for input of a file storage requirement (step S100: No). When detecting input of a file storage requirement (step S100: Yes), the CPU 50 requires input of a destination of file storage (step S110).

General operating systems use a graphical user interface (GUI) shown on the display 54 to visually execute a diversity of operations. In such a GUI environment, as shown in FIG. 4, a file icon FL assigned to each file stored in the HDD 53 is shown in a window FW on the display 54, and a projector icon PJ representing the projector 10 as the destination of transfer is shown on the display 54. In order to move (transfer) a file from the HDD 53 to the projector 10, the process places a mouse pointer MP on a desired file icon FL, moves the mouse pointer MP onto the projector icon PJ during a press of a selection button of the mouse 552, and releases the selection button on the projector ion PJ. This series of actions is a file movement operation known as drag and drop (D&D).

When the coordinate position of the mouse pointer MP overlaps the area of the projector icon PJ during a press of the selection button of the mouse 552 and the selection button of the mouse 552 is then released in the area, the CPU 50 of the personal computer PC detects input of the file storage requirement.

The CPU 50 of the personal computer PC determines whether or not the input destination of file storage is a default (step S120). When the destination of file storage is the default (step S120: Yes), a password input window PW is open on the display 54 (step S130) to ask for setting a password as shown in FIG. 5. In this embodiment, the destination of file storage set as the default is the external storage device 41 of the projector 10. The default is changeable to an arbitrary destination of file storage through the operations on the setting window in this processing routine.

When the input destination of file storage is different from the default (step S120: No), on the other hand, the CPU 50 of the personal computer PC changes the destination of file storage (step S140) and requires setting of a password (step S130). In this embodiment, desired files may be stored in, for example, the file server FS connecting with the personal computer PC via the network line NL. The storage capacity of the external storage device 41 of the projector 10 is generally not so large. The file server FS is thus conveniently used to store a large quantity of files (data).

The CPU 50 of the personal computer PC determines whether or not a password has been set (step S150). When a password has been set (step S150: Yes), the password is mapped to the dragged and dropped file (step S160). The CPU 50 transfers the file mapped to the password to the preset destination of file storage (step S170) and exits from this processing routine. The transferred file is stored in either the external storage device 41 of the projector or the file server FS.

In the process of setting a password, for example, when five arbitrary numerals 1 to 5 are input via the keyboard 551, five asterisks are shown in an input box PW1 of the password input window PW. The user re-enters the same password in a confirmation input box PW2 for the purpose of confirmation and clicks an 'OK' button with the mouse pointer MP to set the password. When input of the password is not required, the user clicks the 'OK' button with the mouse pointer MP with the input box PW1 left blank to close the password input window PW. In this embodiment, the available numerals input from the remote control 40 are 1 to 5 as discussed later, so that the numerals used for setting the password are limited to the range of 1 to 5. Other numerals and letters may be combined according to the specification of the remote control.

When no password has been set (step S150: No), on the other hand, the CPU 50 of the personal computer PC transfers only the file to the preset destination of file storage (step S170) and exits from this processing routine. The transferred file is stored in either the external storage device 41 of the projector or the file server FS.

Figure 6:
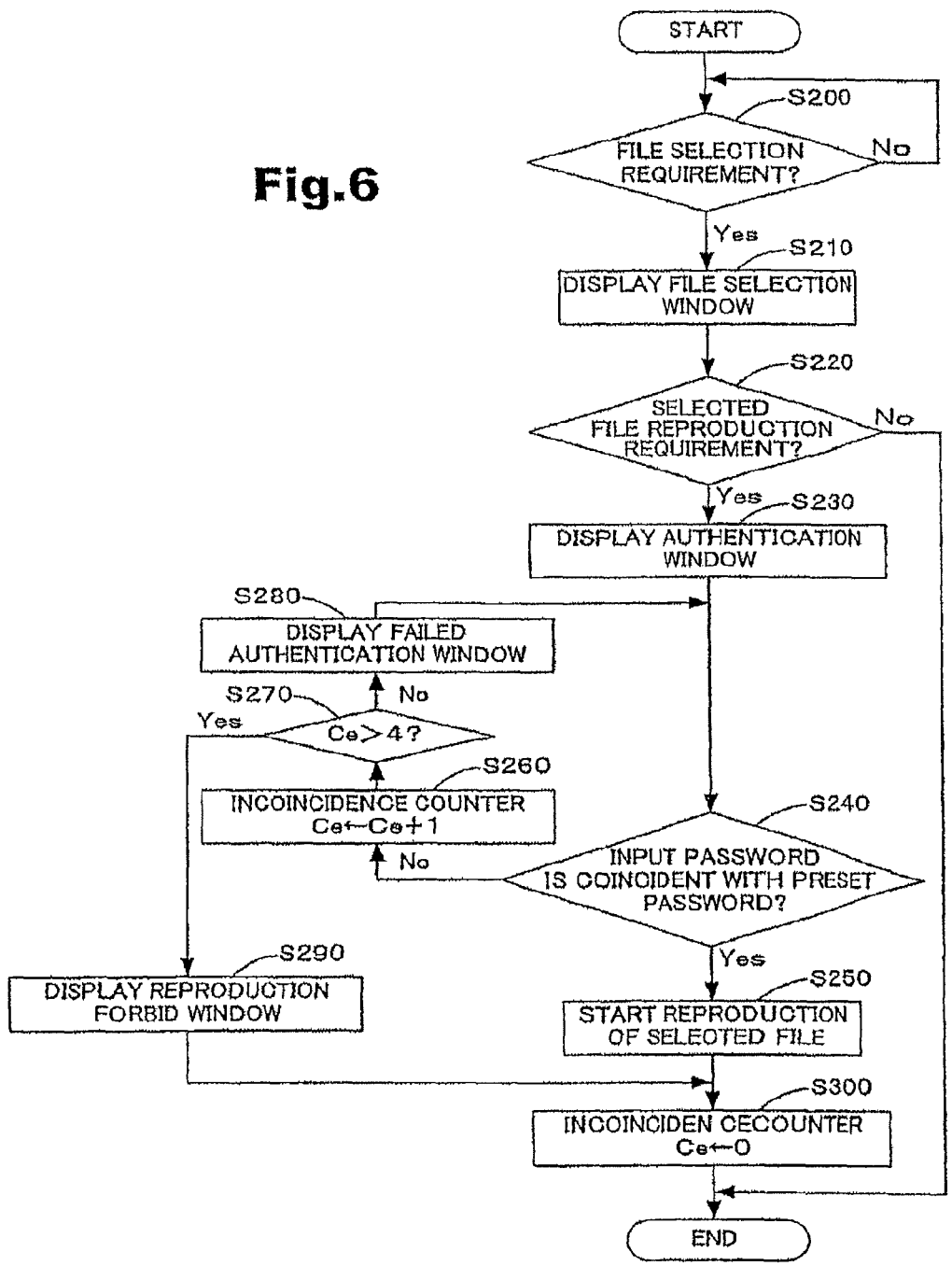
FIG. 6 is a flowchart showing a processing routine executed when the projector 10 reproduces a data file stored in an external storage device 41.
Figure 7:
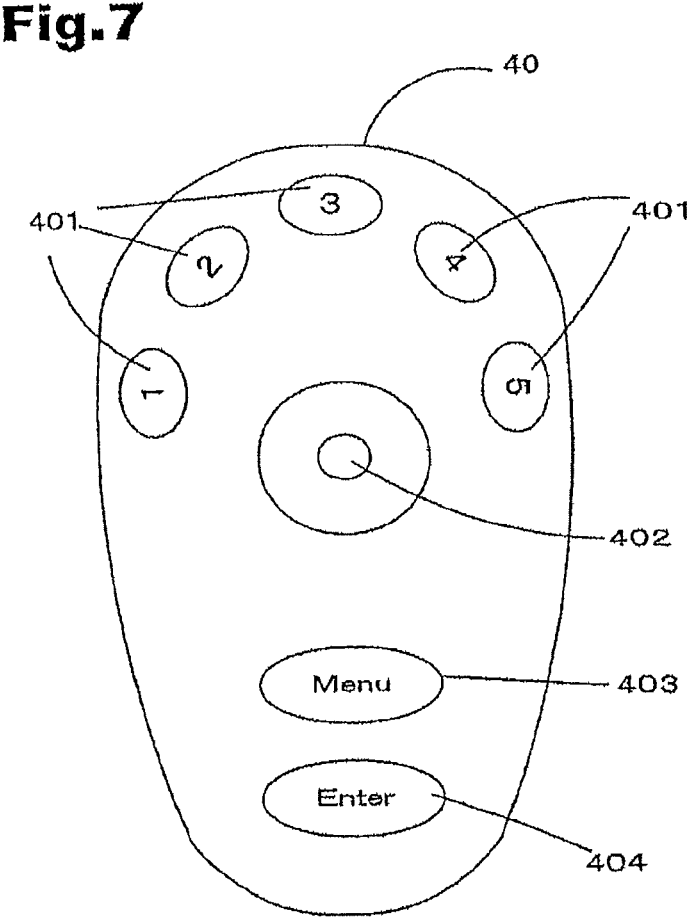
FIG. 7 schematically illustrates a remote control 40 used in the first embodiment.
Figure 8:
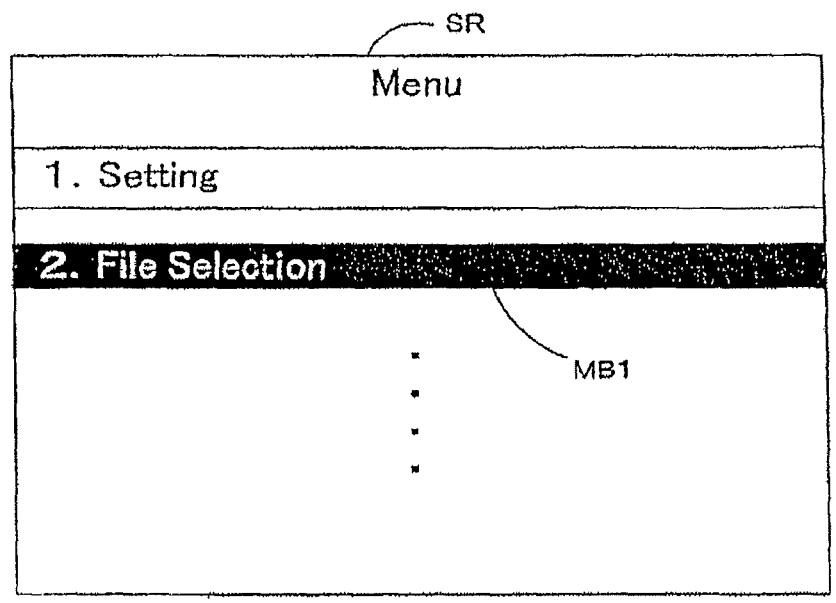
FIG. 8 shows an example of a menu window open on a projection display screen SR of the projector 10.
Figure 9:
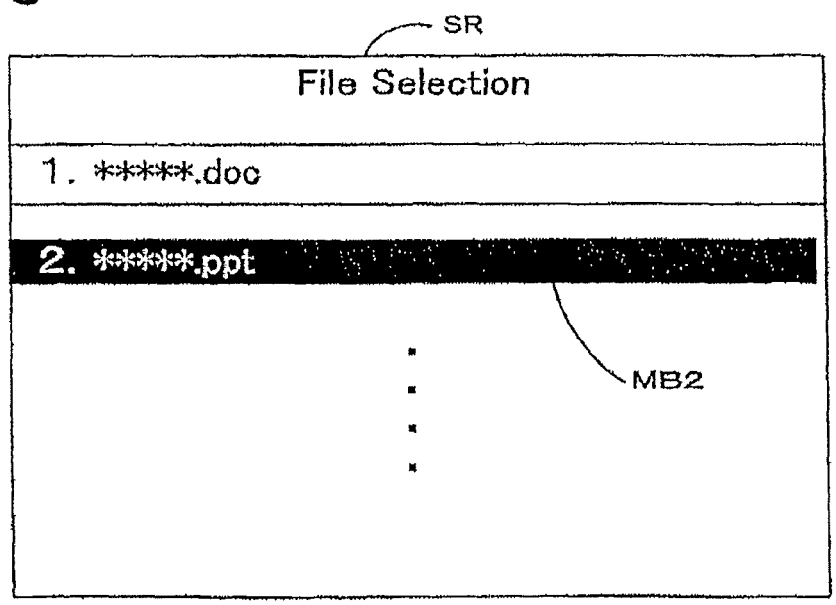
FIG. 9 shows an example of a file selection window open on the projection display screen SR of the projector 10.
Figure 10:
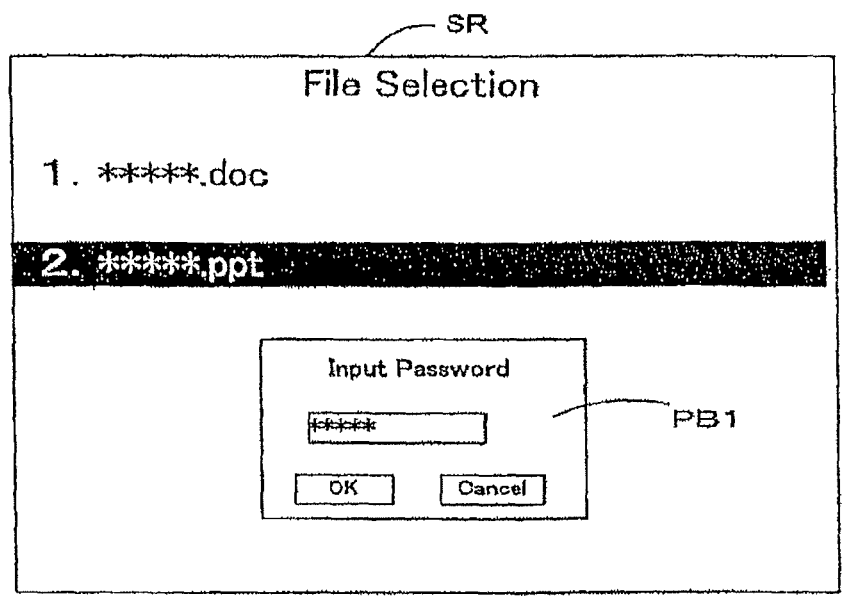
FIG. 10 shows an exemplified display of a password input box PB1 open on the projection display screen SR of the projector 10.
Figure 11:
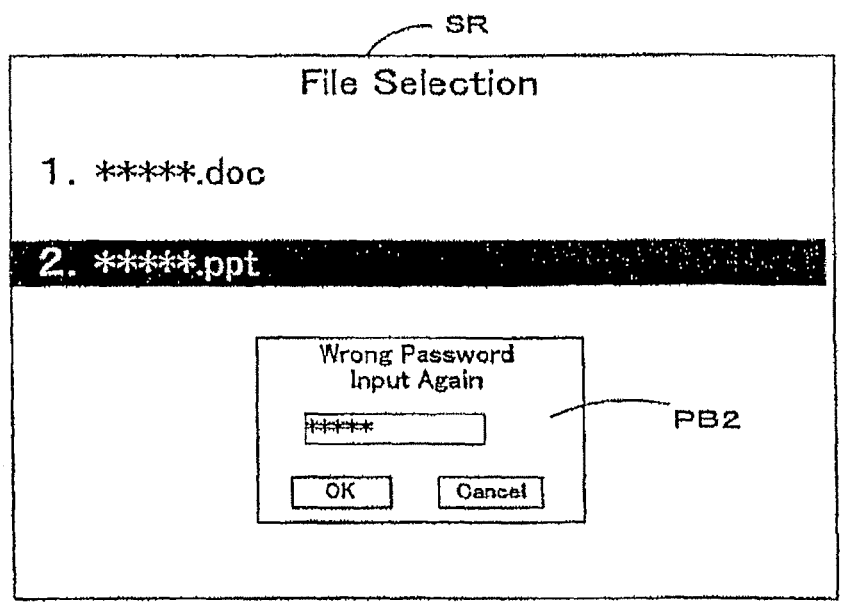
FIG. 11 shows an exemplified display of a failed authentication display box PB2 open on the projection display screen SR of the projector 10.
Figure 12:
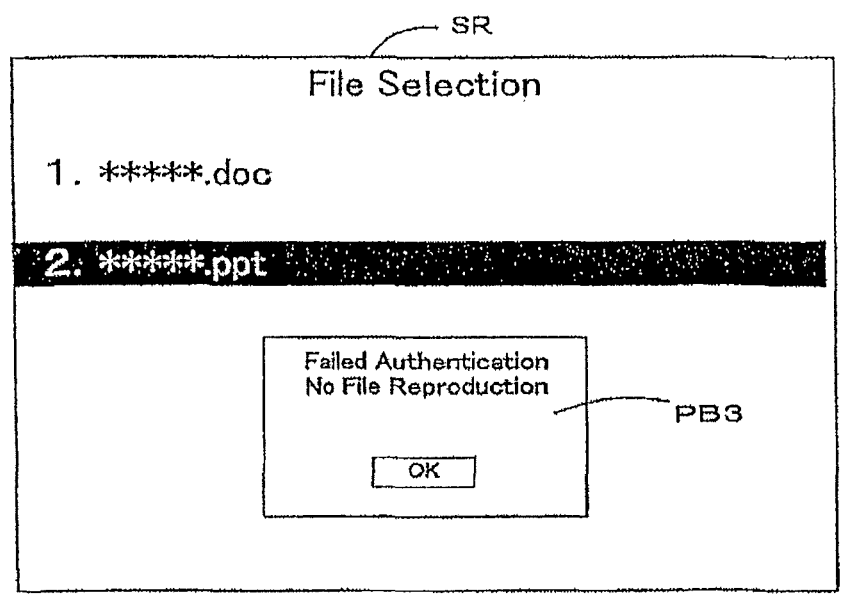
FIG. 12 shows an exemplified display of a reproduction forbid display box PB3 open on the projection display screen SR of the projector 10.

The following describes a series of authentication process executed when the projector 10 reproduces the display data stored in the external storage device 41, with referring to FIGS. 1, 2, and 6 to 12. FIG. 6 is a flowchart showing a processing routine executed when the projector 10 reproduces the data file (display data) stored in the external storage device 41. FIG. 7 schematically illustrates the remote control 40 used in this embodiment. FIG. 8 shows an example of a menu window open on a projection display screen SR of the projector 10. FIG. 9 shows an example of a file selection window open on the projection display screen SR of the projector 10. FIG. 10 shows an exemplified display of a password input box PB1 open on the projection display screen SR of the projector 10. FIG. 11 shows an exemplified display of a failed authentication display box PB2 open on the projection display screen SR of the projector 10. FIG. 12 shows an exemplified display of a reproduction forbid display box PB3 open on the projection display screen SR of the projector 10.

The remote control 40 used for transmitting commands in this processing routine has numeral keys 401 of 1 to 5, which work as function keys to execute previously allocated functions, as shown in FIG. 7. The remote control 40 is also provided with a joy stick 402 for shifting the cursor or pointer position on the projection display screen SR in the vertical direction and in the horizontal direction, a Menu Call key 403, and an Enter key 404. Prior to start of this processing routine, the Menu Call key 403 of the remote control 40 is operated to project and display a menu window shown in FIG. 8.

The first CPU 200 of the projector 10 waits for input of a file selection requirement through operations of the remote control 40 (step S200: No). When detecting input of a file selection requirement (step S200: Yes), the first CPU 200 requires the second CPU 300 to project and display a file selection window shown in FIG. 9 (step S210). The first CPU 200 detects input of the file selection requirement in response to a press of the Enter key 404 while a menu bar MB1, that is, a menu option '2. File Selection', is highlighted through the operation of the joy stick 402 on the menu window shown in FIG. 8.

The first CPU 200 determines whether or not input of a selected file reproduction requirement is detected (step S220). The first CPU 200 detects input of the selected file reproduction requirement in response to a press of the Enter key 404 while a menu bar MB2, that is, a desired file option '2. *****.ppt', is highlighted through the operation of the joy stick 402 on the file selection window shown in FIG. 9.

When detecting input of the selected file reproduction requirement (step S220: Yes), the first CPU 200 requires the second CPU 300 to project and display a password input box PB1 shown in FIG. 10 (step S230). In the password input box PB1, input of a password is required. The password consisting of the combination of five numerals 1 to 5 is input through the operation of the function keys 401 on the remote control 40. The first CPU 200 compares the input password with the preset password (step S240). When both the passwords are coincident with each other (step S240: Yes), the first CPU 200 requires the graphics controller 210 to draw the selected file and starts reproduction of the selected file (step S250). The video data drawn and generated by the graphics controller 210 are processed through the video signal processing circuit 310, the LCD driving circuit 330, the LCD 332, and the projection optical system 360 of the projector module 30 and projected and displayed on the projection screen.

When the password input via the remote control 40 is not coincident with the preset password (step S240: No), the first CPU 200 increments a count Ce on an incoincidence counter that counts the frequency of incoincidence by one (step S260). The count Ce should be a positive integral value. The first CPU 200 then determines whether or not the count Ce on the incoincidence counter is not less than 4 (step S270). When the count Ce on the incoincidence counter is 3 or less (step S270: No), the first CPU 200 requires the second CPU 300 to project and display a failed authentication display box PB2 shown in FIG. 11 (step S280). The first CPU 200 waits for another input of the password under the display of the failed authentication display box PB2.

When the count Ce on the incoincidence counter is 4 or greater (step S270: Yes), on the other hand, the first CPU 200 requires the second CPU 300 to project and display a reproduction forbid display box PB3 shown in FIG. 12 (step S290) and does not execute reproduction of the selected file. In order to prevent illegal accesses, reproduction of the selected file is prohibited if incoincidence of the password continues a predetermined number of times (four in this embodiment). In response to a click of an 'OK' button on the reproduction forbid display box PB3 with the mouse 552 (the mouse pointer), the first CPU 200 shifts the processing to step S300.

The first CPU 200 resets the count Ce on the incoincidence counter to zero (step S300), before exiting from this processing routine.

When detecting no input of the selected file reproduction requirement (step S220: No), the first CPU 200 immediately exits from this processing routine. This corresponds to, for example, a case of confirming files stored in the external storage device 41 of the projector 10.

As described above, the arrangement of the first embodiment enables display data (files) to be transferred to and stored in the external storage device 41 of the projector 10 via the network line NL. Data files required for presentation may be stored in advance in the external storage device 41 of the projector 40. This arrangement enables the projector 10 to be used alone for presentation without connecting with the personal computer PC. This desirably saves the labor and time for connection with the personal computer PC every time the projector 10 is used.

In the arrangement of the first embodiment, the drag and drop of the file icon FL onto the projector icon PJ on the display 54 of the personal computer PC enables the corresponding selected file to be transferred to and stored in the projector 10. This ensures the visual check on the file transfer and storage operation. Prior to start of the file transfer from the personal computer PC to the projector 10, the password setting window PW is open on the display 54 to set the password mapped to the selected file. This ensures the secrecy of the file.

In the arrangement of the first embodiment, in response to a file reproduction instruction, the projector 10 displays the password input box PB1 on the projection display screen SR to wait for input of the password. The projector 10 starts reproduction of the selected file only when the input password is coincident with the preset password. This arrangement effectively prevents any file stored in the external storage device 41 from being illegally reproduced by any third person, and thus assures the secrecy of files. Even when a large number of people share one projector PJ, there is no need of eliminating the existing files from the external storage device 41 on every occasion of use. Namely the secrecy of the respective files is desirably kept even when a plurality of people share the projector 10 with the existing files stored in the external storage device 41.

In the technique of the first embodiment, the preset password is a combination of available numerals (1 to 5) on the remote control 40. There is accordingly no need of using a separate input device other than the remote control 40 to input the password on the projector 10.

Second Embodiment

The following describes another projector in a second embodiment of the present invention. The description mainly regards the differences in the structure of the projector of the second embodiment. The constituents of the projector of the second embodiment that are identical with those of the projector of the first embodiment are expressed by the same symbols as those used in the first embodiment and are not specifically described here.

D. Layout of Projector in Second Embodiment

Figure 13:
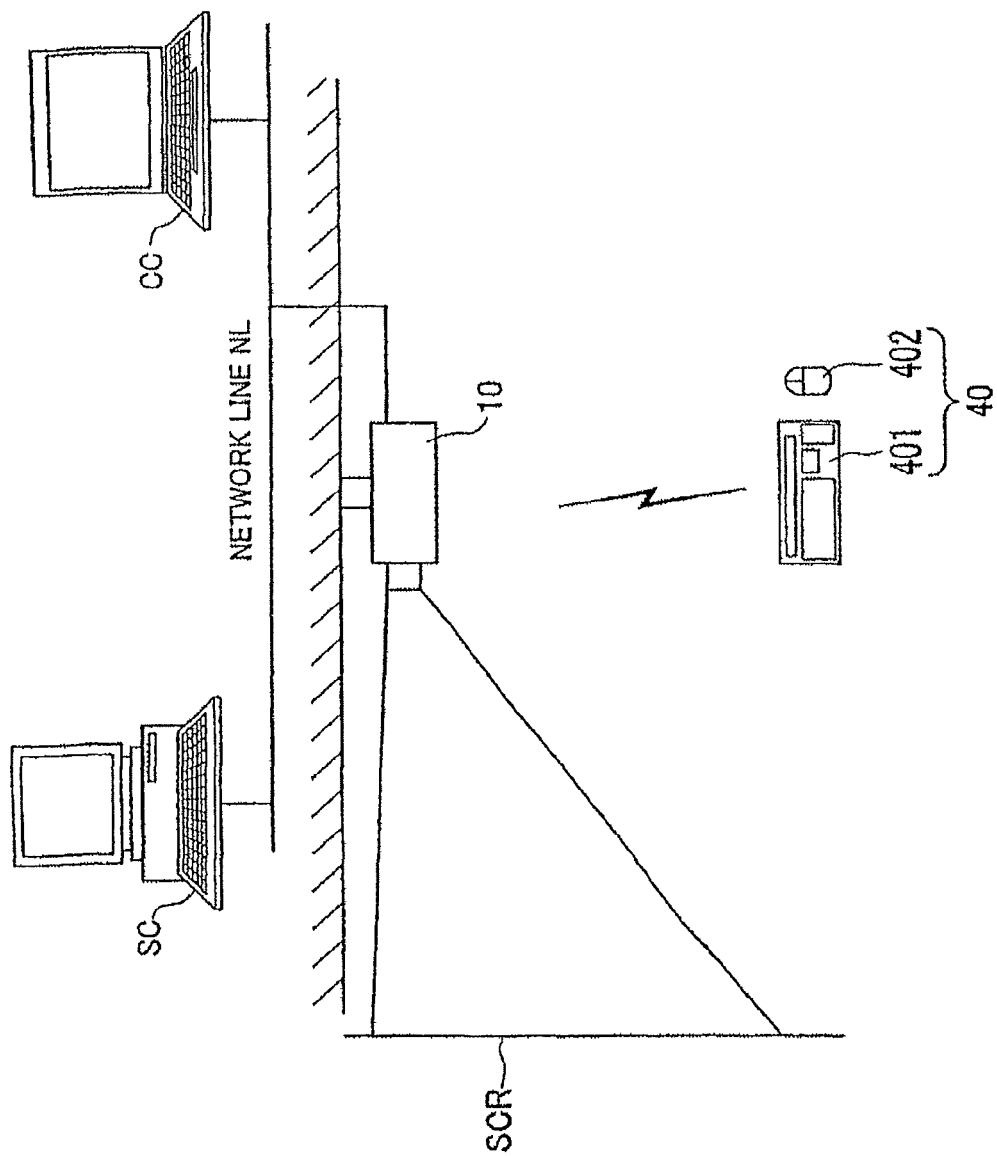
FIG. 13 illustrates a layout of another projector in a second embodiment of the present invention.

FIG. 13 illustrates a layout of the projector in the second embodiment of the present invention. The projector 10 may be, for example, suspended from the ceiling as shown in FIG. 13. The projector 10 is connected to the network line NL and transmits data and commands to and from a server computer SC and a client computer CC via the network line NL. The user can input commands and data into the projector 10 with an external wireless input device 40, such as a wireless keyboard 401 and a wireless mouse 402. Images supplied from a non-illustrated image supply apparatus to the projector 10 are projected on a projection screen SCR.

In the structure of the second embodiment, the ASP terminal module 20 functions as a Web server module. One of the functions of the Web server module distributes Web pages including working status information, which represent the working status of the projection display module. Web server applications for releasing Web pages are thus stored, in addition to the viewer applications and other applications, in the first ROM 202. When the ASP terminal module 20 functions as the Web server module, the first CPU 200 reads a Web server application from the first ROM 202 and activates the Web server application to distribute specified Web page information to a Web client (also called a Web browser).

E. Control of Working State of Projector in Second Embodiment

Figure 14:
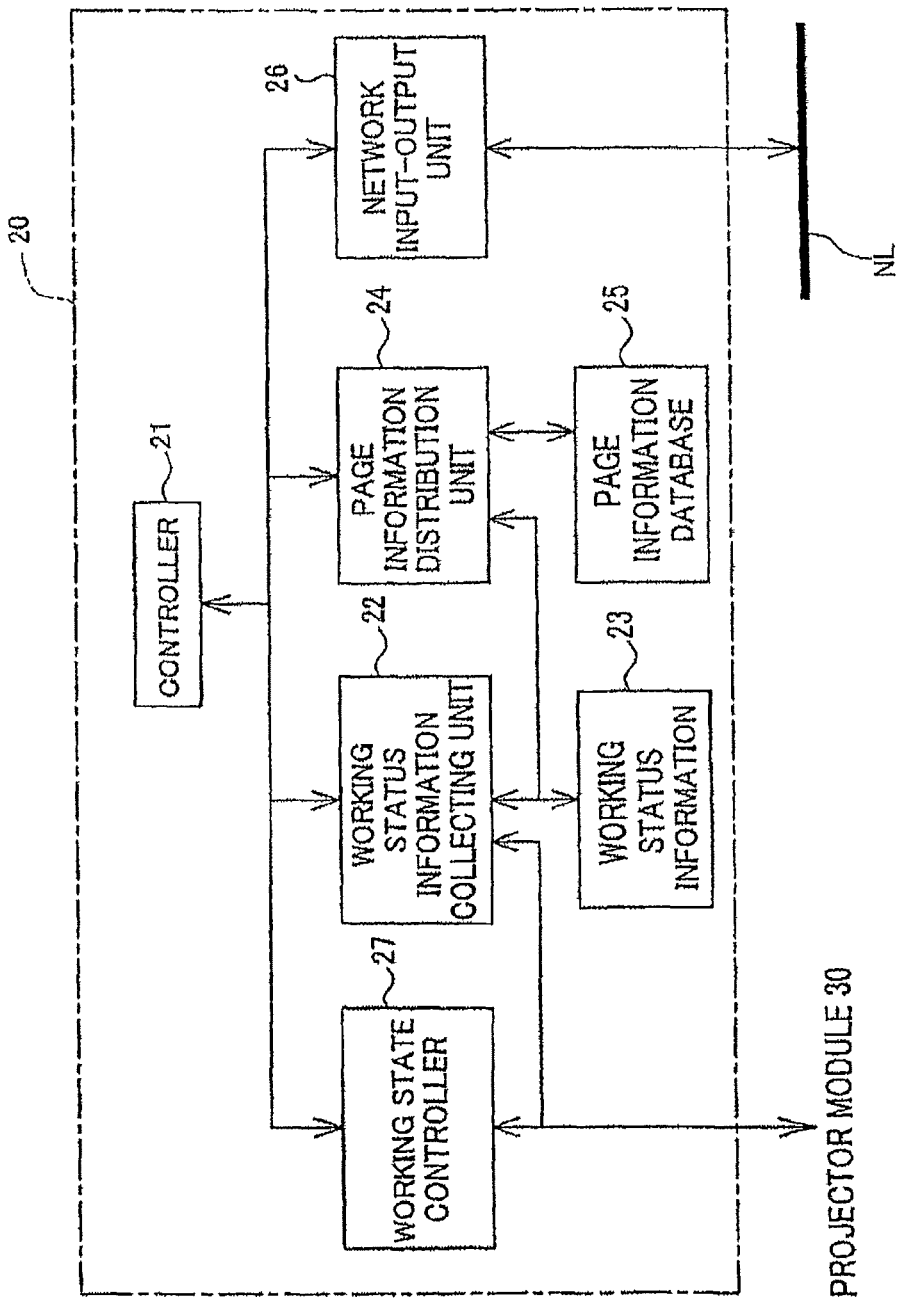
FIG. 14 is a functional block diagram illustrating the construction of an ASP terminal module 20 functioning as a Web server module.
Figure 15:
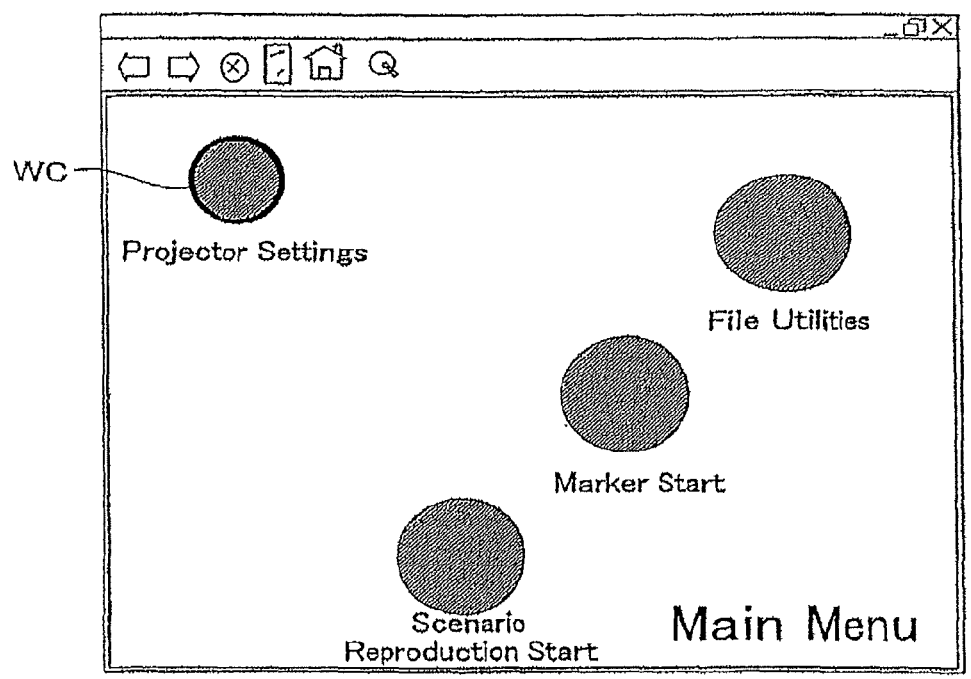
FIG. 15 shows a homepage distributed from the Web server module 20 and displayed on a Web browser CC.

FIG. 14 is a functional block diagram illustrating the construction of the ASP terminal module 20 functioning as the Web server module. The first CPU 200 executes the Web server application stored in the first ROM 202, so that the ASP terminal module 20 functions as the Web server module. In the following discussion, the ASP terminal module 20 may be referred to as the Web server module 20. The Web server module 20 mainly includes a controller 21 that controls the general operations, a working status information collecting unit 22, a page information distribution unit 24, a network input-output unit 26, and a working state controller 27.

The network input-output unit 26 functions to control the operations of the network I/F controller 220. The working status information collecting unit 22 functions to collect information representing the working conditions of the projector module 30 and the ASP terminal module 20 as working status information 23. The information representing the working conditions of the ASP terminal module 20 are stored in the first ROM 202 and the first RAM 204 (see FIG. 2). The information representing the working conditions of the projector module 30 are stored in the second ROM 302 and the second Ram 304 (see FIG. 2) and are transferred from the second CPU 300 via the I/O port 230.

The page information distribution unit 24 functions to, in response to a requirement from the Web client (or the Web browser) executed in the client computer CC, select page information representing a corresponding Web page out of a page information database 25 and distribute the selected page information. The page information to be distributed may include the working status information 23 collected by the working status information collecting unit 22.

The working state controller 27 functions to control the working state of the ASP terminal module 20 according to control information (a command) sent back from the Web browser, while supplying a control signal to the projector module 30 to control the working state of the projector module 30. The projector module 30 controls a corresponding working condition in response to the supplied control signal. A Web page update command is sent back with the control information from the Web browser. When the working state controller 27 controls the working state, the working status information collecting unit 22 newly collects the working status information 23 and the page information distribution unit 24 distributes the page information including the newly collected working status information to update the Web page displayed on the Web browser. The working status information collecting unit 22 may monitor a change of the working state irrespective of the control by the working state controller 27 and newly collect the working status information if there is any change.

The working state controller 27 corresponds to the control signal supply module of the present invention, and the working status information collecting unit 22 and the page information distribution unit 24 correspond to the page information updating module of the present invention.

The following describes a procedure of setting various working conditions of the projector from the client computer CC with referring to FIGS. 15 to 19. In the Web browser executed by the client computer CC (hereinafter may simply be referred to as the 'Web browser CC'), in response to input of a URL (Uniform Resource Locator) assigned to the Web server module 20, the Web server module 20 distributes corresponding homepage information to the Web browser CC. The Web browser CC then opens a homepage shown in FIG. 15.

Figure 16:
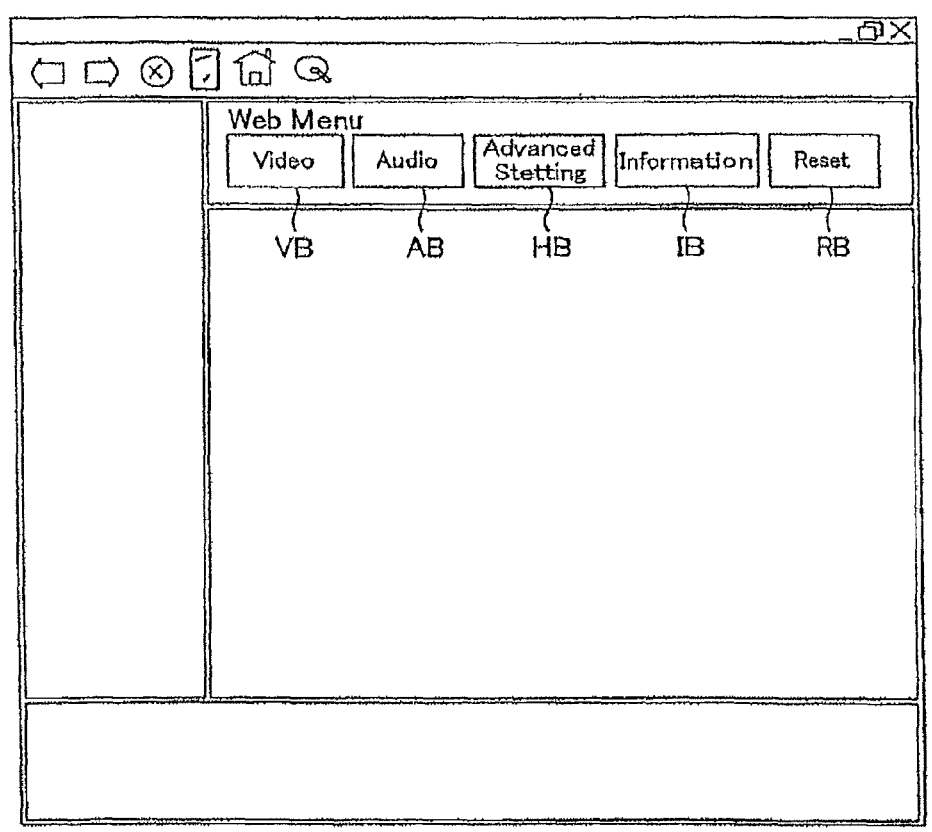
FIG. 16 shows a working state setting menu window open on the Web browser CC as a Web page.

When the user selects and clicks a working state setting icon WC on the homepage displayed on the Web browser CC, the URL assigned to the clicked working state setting icon WC is specified. The Web server module 20 selects page information corresponding to the specified URL out of the page information database 25 and distributes the selected page information to the Web browser CC. The Web browser CC opens a working state setting menu window shown in FIG. 16 as a Web page. FIG. 16 shows a Web Menu including five option buttons, a Video button VB, an Audio button AB, a Advanced Setting button HB, an Information button IB, and a Reset button RB.

Figure 17:
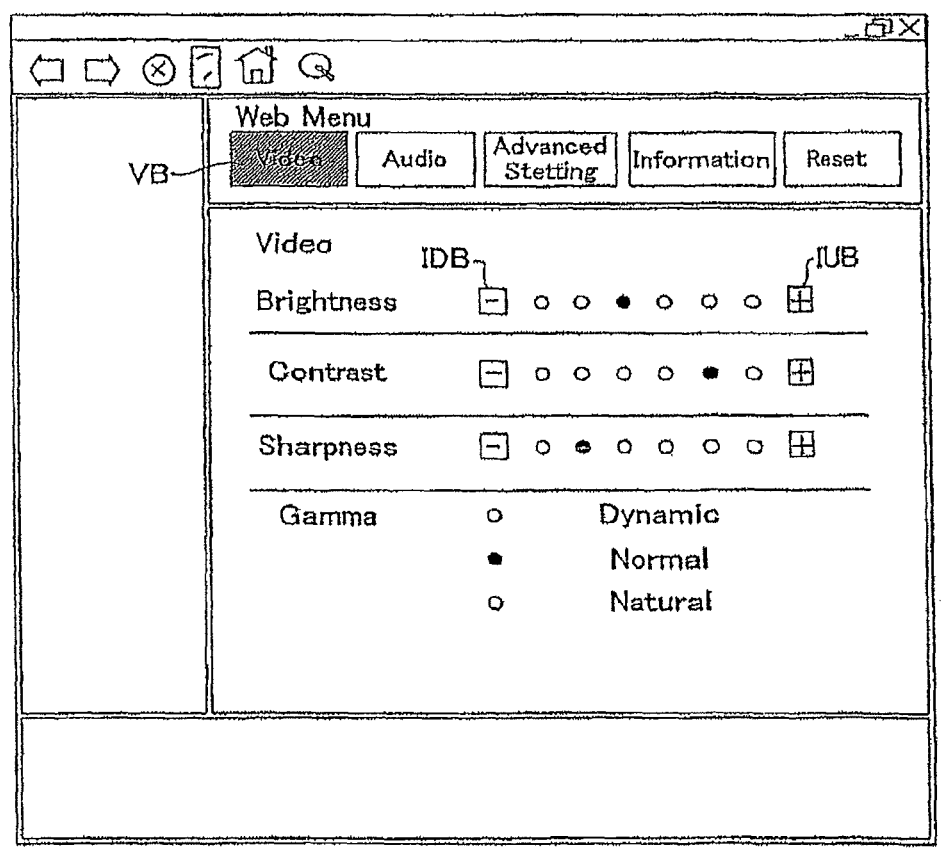
FIG. 17 shows a video setting window open on the Web browser CC as a Web page.

When the user presses a desired option button among the five option buttons, the URL assigned to the pressed option button is specified. The Web server module 20 selects page information corresponding to the specified URL out of the page information database 25 and distributes the selected page information to the Web browser CC. A corresponding setting window is then displayed on the Web browser CC as the Web page. For example, in response to a press of the Video button VB, a video setting window shown in FIG. 17 is open. FIG. 17 shows a menu including four menu options, that is, 'Brightness', 'Contrast', 'Sharpness', and 'Gamma Correction' as image-related controllable working conditions.

A 'Brightness' field includes a working state display scale expressed by six brightness levels, as well as a Brightness Down button IDB on the left side of the working state display scale and a Brightness Up button IUB on the right side of the working state display scale. 'Contrast' and 'Sharpness' fields respectively have the same arrangement as that of the 'Brightness' field.

A 'Gamma Correction' field includes three radio buttons corresponding to three different levels, 'Dynamic', 'Normal', and 'Natural'.

Figure 18:
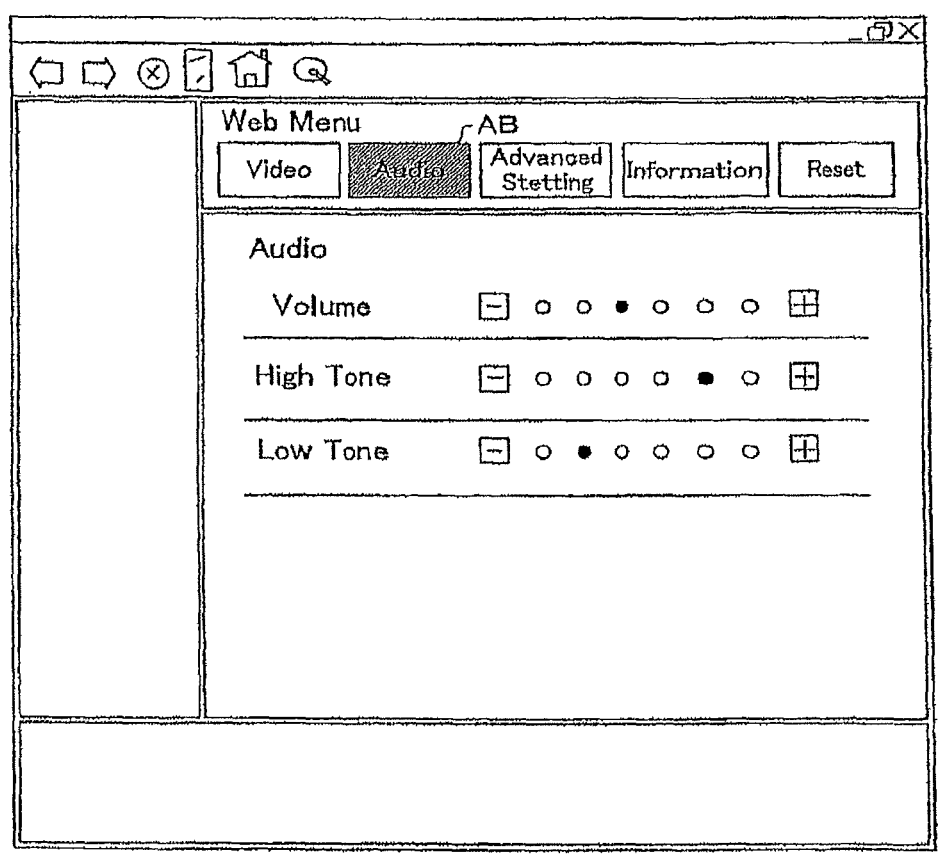
FIG. 18 shows an audio setting window open on the Web browser CC as a Web page.

In another example, in response to a press of the Audio button AB in FIG. 16, an audio setting window shown in FIG. 18 is open. FIG. 18 shows a menu including three menu options 'Volume', 'High Tone' and 'Low Tone' as audio-related controllable working conditions. 'Volume', 'High Tone' and 'Low Tone' fields respectively have the same arrangement as that of the 'Brightness' field.

A corresponding Web window is displayed in response to a press of one of the other option buttons shown in FIG. 16, that is, the Advanced Setting button HB, the Information button IB, and the Reset button RB. In response to a press of the Advanced Setting button HB, various setting windows are open for projector-related settings, such as settings of color and projector installation environment (for example, suspended from the ceiling or rear projection). In response to a press of the Information button IB, projector-related information, for example, a lamp-on time, an image type, and a resolution, is displayed. In response to a press of the Reset button RB, a setting window is open to initialize the working conditions of the projector.

A process of changing the working condition of the projector 10 is discussed below with an example of changing the brightness of the image on the video setting window shown in FIG. 17. The Brightness Up button IUB is pressed to heighten the brightness, whereas the Brightness Down button IDB is pressed to lower the brightness. One press of the Brightness Up button IUB causes control information for heightening the brightness level by one step (brightness up command) to be transmitted to the Web server module 20. Simultaneously a Web page update command is transmitted to once close the video setting window displayed on the Web browser CC as the Web page.

Figure 19:
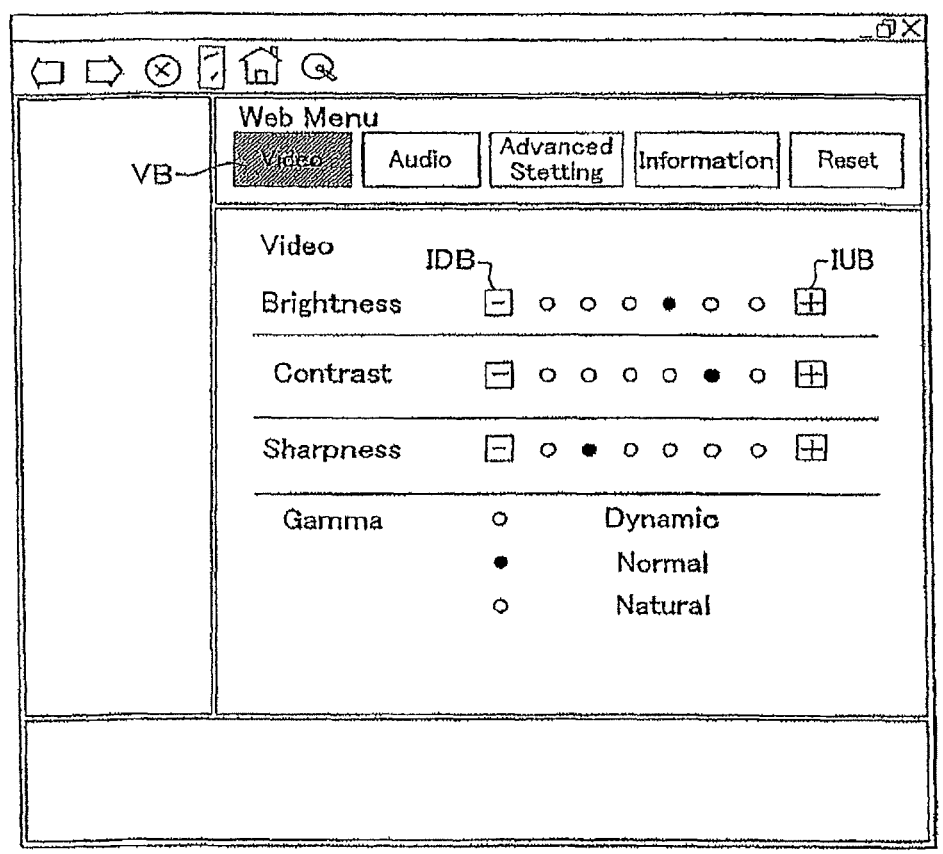
FIG. 19 shows the video setting window after an increase in brightness by one step.

The working state controller 27 of the Web server module 20 (see FIG. 14) identifies the transmitted control information (command) as either information addressed to the projector module 30 or information addressed to the ASP terminal module 20. The brightness up command is identified as the command addressed to the projector module 30 and is thus transferred to the projector module 30. The projector module 30 heightens the brightness of the image in response to this command. Namely the working condition of the projector module 30 is changed. The working status information collecting unit 22 (FIG. 14) newly collects information representing the updated working condition of the projector module 30 as the working status information 23. The page information distribution unit 24 (FIG. 14) then distributes the page information including the newly collected working status information to the Web browser CC. The video setting window is open again on the Web browser CC as the Web page updated according to the newly collected working status information 23. FIG. 19 shows the video setting window after a rise of the brightness level by one step. The lit-up radio button on the brightness display scale is shifted to the one-step up position from the position of FIG. 17 (namely, the position of the closed circle is shifted rightward by one from the position of FIG. 17).

Although the above description regards the process of changing the brightness of the image in the video setting window, the similar procedure is applied for the setting in various other setting windows.

As described above, in the arrangement of the second embodiment, various working conditions of the projector 10 are regulated according to the user's input control information on the Web page distributed to and displayed on the Web browser, which is executed in the client computer CC, by the Web server module 20. This arrangement enables the user who is apart from the projector 10 to readily control the working conditions of the projector 10. Compared with the prior art projectors, the projector of this embodiment thus enhances the operatability for controlling the working conditions thereof.

The Web page discussed in the second embodiment is just an example for the purpose of describing the present invention, and the present invention is not restricted to this example in any sense.

F. Third Embodiment

Figure 20:
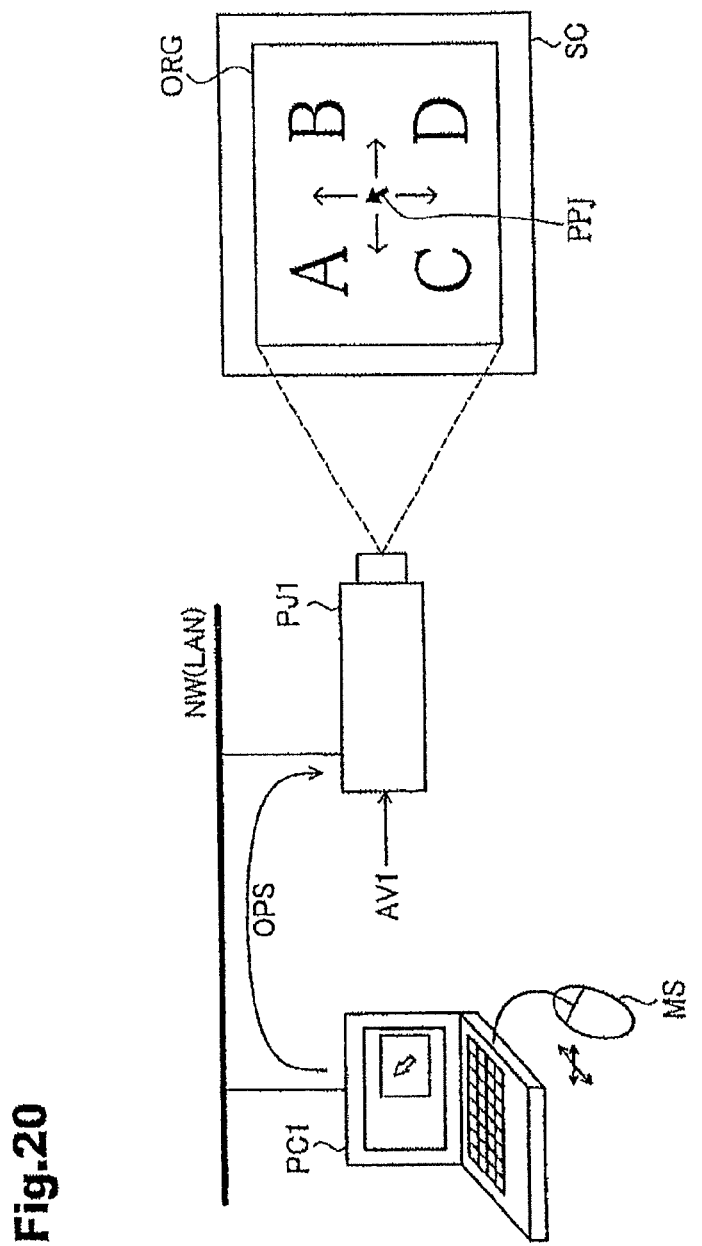
FIG. 20 illustrates a projection display system in a third embodiment of the present invention.

The following describes still another projector in a third embodiment of the present invention. FIG. 20 illustrates a projection display system in the third embodiment of the present invention. This projection display system includes a projector PJ1 (that is, a projection-type display apparatus PJ1) and a computer PC1, which are connected to each other via a network NW, such as a LAN. The computer PC1 shown in FIG. 20 corresponds to the external input apparatus of the present invention.

Referring to FIG. 20, the computer PC1 is provided with a mouse MS as a pointing device. As discussed later, operation information OPS corresponding to an operation of the mouse MS is supplied to the projector PJ1 via the network NW. The projector PJ1 carries out a preset series of processing with regard to an image to be projected and displayed, based on the operation information OPS. For example, the projector PJ1 causes a pointer image PPJ to be generated in an original image ORG displayed on a screen SC, based on the operation information OPS supplied via the network NW. In the embodiment of FIG. 20, the computer PC1 supplies the operation information OPS to the projector PJ1, but does not supply video data representing the original image ORG and the pointer image PPJ.

Figure 21:
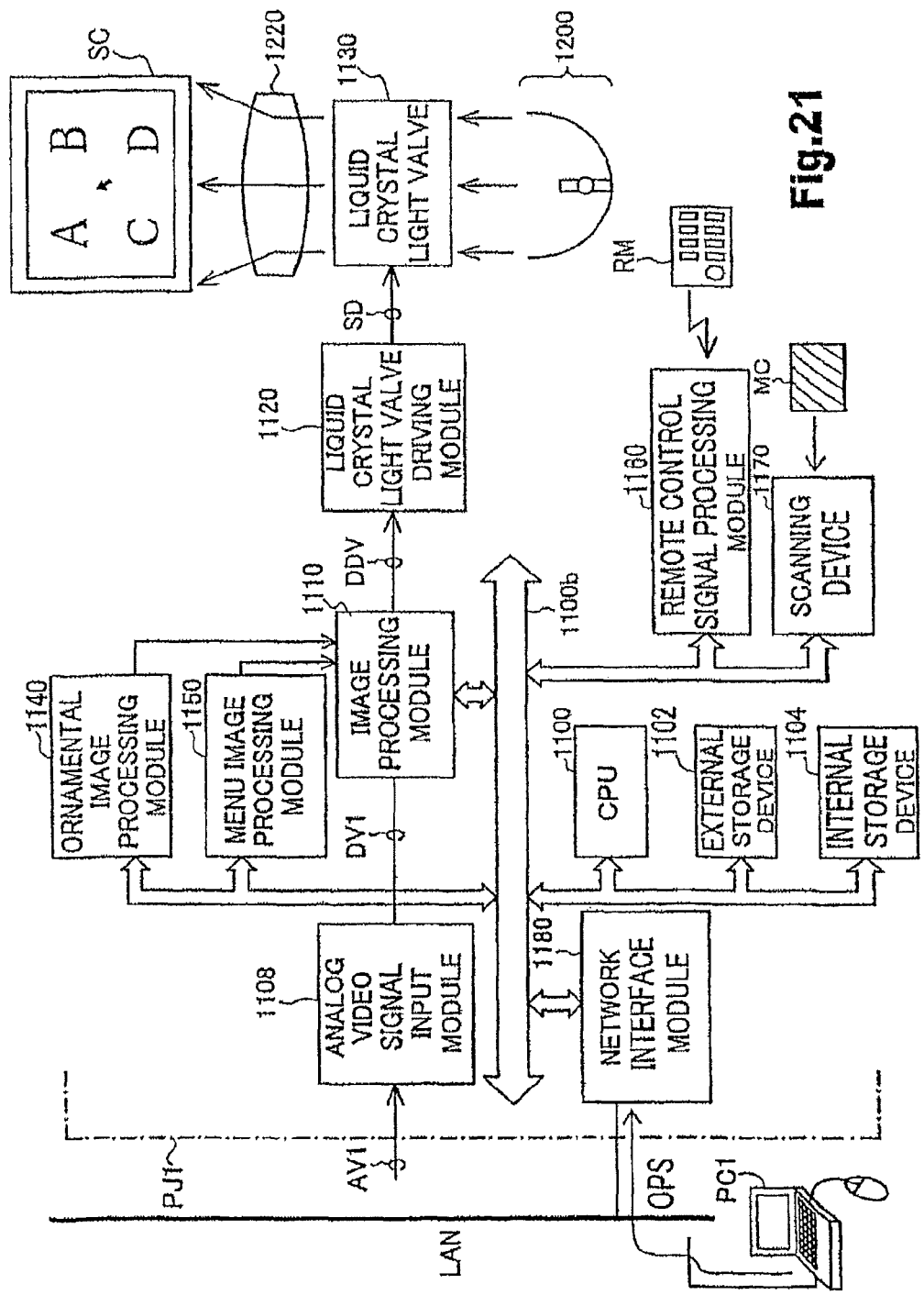
FIG. 21 schematically illustrates the structure of a projector PJ1 shown in FIG. 20.

FIG. 21 schematically illustrates the structure of the projector PJ1 shown in FIG. 20. The projector PJ1 includes a CPU 1100, an external storage device 1102, an internal storage device 1104 like a ROM and a RAM, an analog video signal input module 1108, an image processing module 1110, a liquid crystal light valve driving module 1120, a liquid crystal light valve 1130, an ornamental image processing module 1140, a menu image processing module 1150, a remote control signal processing module 1160, a scanning device 1170 that reads, for example, video data stored in a memory card MC, and a network interface module 1180. The CPU 1100, the external storage device, 1102, the internal storage device 1104, the image processing module 1110, the ornamental image processing module 1140, the menu window processing module 1150, the remote control signal processing module 1160, the scanning device 1170, and the network interface module 1180 are mutually connected via a bus 1100b. The liquid crystal light valve 1130 is illuminated substantially uniformly with a lighting optical system 11200. Image rays formed by the light crystal light valve 1130 are projected on the screen SC by the function of a projection optical system 1220. In the illustration of FIG. 21, the optical systems 11200 and 1220 are simplified.

An input device, such as a keyboard and a mouse, may be connected to the projector PJ1 of the embodiment via a non-illustrated interface.

The analog video signal input module 1108 receives an analog video signal AV1 supplied from an external image supply apparatus (not shown). The analog video signal AV1 may be, for example, an RGB signal representing a computer image supplied from a personal computer or a composite video signal representing a motion picture supplied from a video recorder or a television set. The analog video signal input module 1108 functions to carry out A-D conversion of the input analog video signal AV1 and output a digital video data DV1.

The image processing module 1110 functions to combine original video data with ornamental video data and thereby generate composite video data. This causes the pointer image PPJ (see FIG. 20) expressed by the ornamental video data to be superimposed on the original image ORG (see FIG. 20) expressed by the original video data. The original video data are temporarily written into a non-illustrated frame memory included in the image processing module 1110. The image processing module 1110 combines the original video data with the ornamental video data when reading the original video data from the frame memory, and supplies resulting composite video data DDV to the liquid crystal light valve driving module 1120.

The original video data may be the video data DV1 supplied from the analog video signal input module 1108, video data supplied from the network via the network interface module 1180, menu video data supplied from the menu image processing module 1150, and video data read from the memory card MC supplied from the scanning device 1170. The ornamental video data is supplied from the ornamental image processing module 1140.

The ornamental image represents an image prepared independently of the original image (that is, an additional image), and is superimposed on (added to) the original image to be projected and displayed on the screen SC.

The liquid crystal light valve driving module 1120 generates image display data SD according to the composite video data DDV supplied from the image processing module 1110. The liquid crystal light valve 1130 is driven in response to the image display data SD. The liquid crystal light valve 1130 modulates the light emitted from the lighting optical system 11200 to generate image rays representing an image.

The ornamental image processing module 1140 functions to generate ornamental video data representing an ornamental image and supply the ornamental video data to the image processing module 1110. More concretely the ornamental image processing module 1140 generates diverse ornamental video data, for example, pointer video data representing the pointer image PPJ (see FIG. 20) and data representing specific shaped images (for example, finger-pointing images) and drawing images (for example, box images and frame images) of desired sizes generated by specifying the range with the pointer image PPJ, and supplies the generated ornamental video data to the image processing module 1110.

The menu image processing module 1150 functions to generate menu video data representing a menu image and supply the menu video data to the image processing module 1110. The user specifies various settings relating to the projector PJ1 according to the menu image.

The network interface module 1180 functions to connect the projector PJ1 with the LAN and supply the operation information OPS, which has been transmitted from the computer PC1 via the LAN, to the CPU 1100 via the bus 1100b. The CPU 1100 controls the image processing module 1110, the ornamental image processing module 1140, and the menu image processing module 1150, based on the supplied operation information OPS. In the case where the operation information OPS includes positional information representing the position of the pointer image PPJ (FIG. 20) to be superimposed on the original image ORG, the ornamental image processing module 1140 transmits the pointer video data to the image processing module 1110, based on the operation information (positional information) OPS. The image processing module 1110 combines the pointer video data with the original video data according to the operation information (positional information) OPS, so that the pointer image PPJ is superimposed at the preset position on the original image ORG. The network interface module 1180 also functions to supply video data, which has been transmitted via the LAN, to the image processing module 1110 as the original video data as discussed later.

The remote control signal processing module 1160 (FIG. 21) controls the functions of the respective constituents of the projector PJ1 in response to control signals sent from a remote control RM. For example, the remote control signal processing module 1160 controls the functions of the ornamental image processing module 1140 in response to a control signal sent from the remote control RM and causes the pointer image PPJ to be superimposed at a preset position on the original image ORG. In the projection display system of this embodiment, the mouse MS (see FIG. 20) of the computer PC1 connecting with the LAN may be operated in place of the remote control RM to superimpose the pointer image PPJ at the preset position on the original image ORG.

The CPU 1100, the image processing module 1110, and the ornamental image processing module 1140 shown in FIG. 21 correspond to the video data generation module of the present invention.

Figure 22:
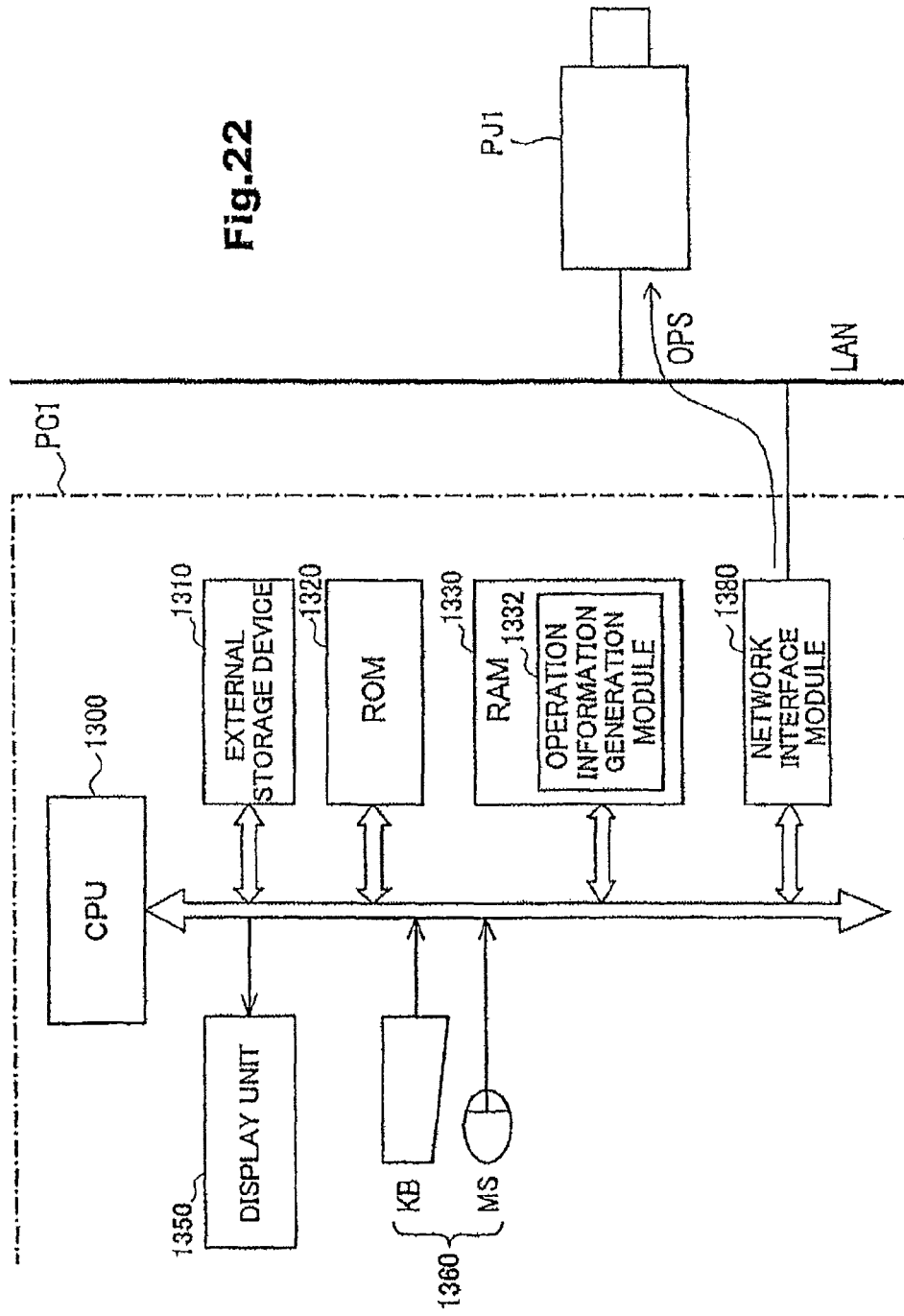
FIG. 22 schematically illustrates the structure of a computer PC1 shown in FIG. 20.

FIG. 22 schematically illustrates the structure of the computer PC1 shown in FIG. 20. The computer PC1 includes a CPU 1300, an external storage device 1310, a ROM 1320, a RAM 1330, a display unit 1350, and an input unit 1360 like a mouse MS and a keyboard KB. The computer PC1 is also provided with a network interface module 1380 for connection with the LAN.

A programs for actualizing the functions of an operation information generation module 1332 is stored in the RAM 1330. The operation information generation module 1332 functions to detect a user's operation of the input unit 1360 and generate the operation information OPS based on the result of the detection. The generated operation information OPS is supplied to the projector PJ1 via the network interface module 1380.

The computer program for actualizing the functions of the operation information generation module 1332 is recorded in a computer readable recording medium, such as a flexible disk or a CD-ROM. The computer reads the computer program from the recording medium and transfers the computer program to either the internal storage device or the external storage device. The computer program may be supplied to the computer via a communication path. A microprocessor in the computer executes the computer program stored in the internal storage device to actualize the functions of the computer program. Otherwise the computer may directly read and execute the computer program recorded in the recording medium.

In the specification hereof, the term 'computer' is the concept including the hardware structure and the operating system and represents the hardware structure working under control of the operating system. In the case where the operating system is not required but an application program alone actuates the hardware structure, the hardware structure itself is equivalent to the computer. The hardware structure includes at least a microprocessor like a CPU and means for reading a computer program recorded in a recording medium. The computer program includes program codes, which cause the computer to attain the functions of the respective means. Part of the functions may be actualized by the operating system, instead of the application program.

Available examples of the 'recording medium' in the present invention include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

Figure 23:
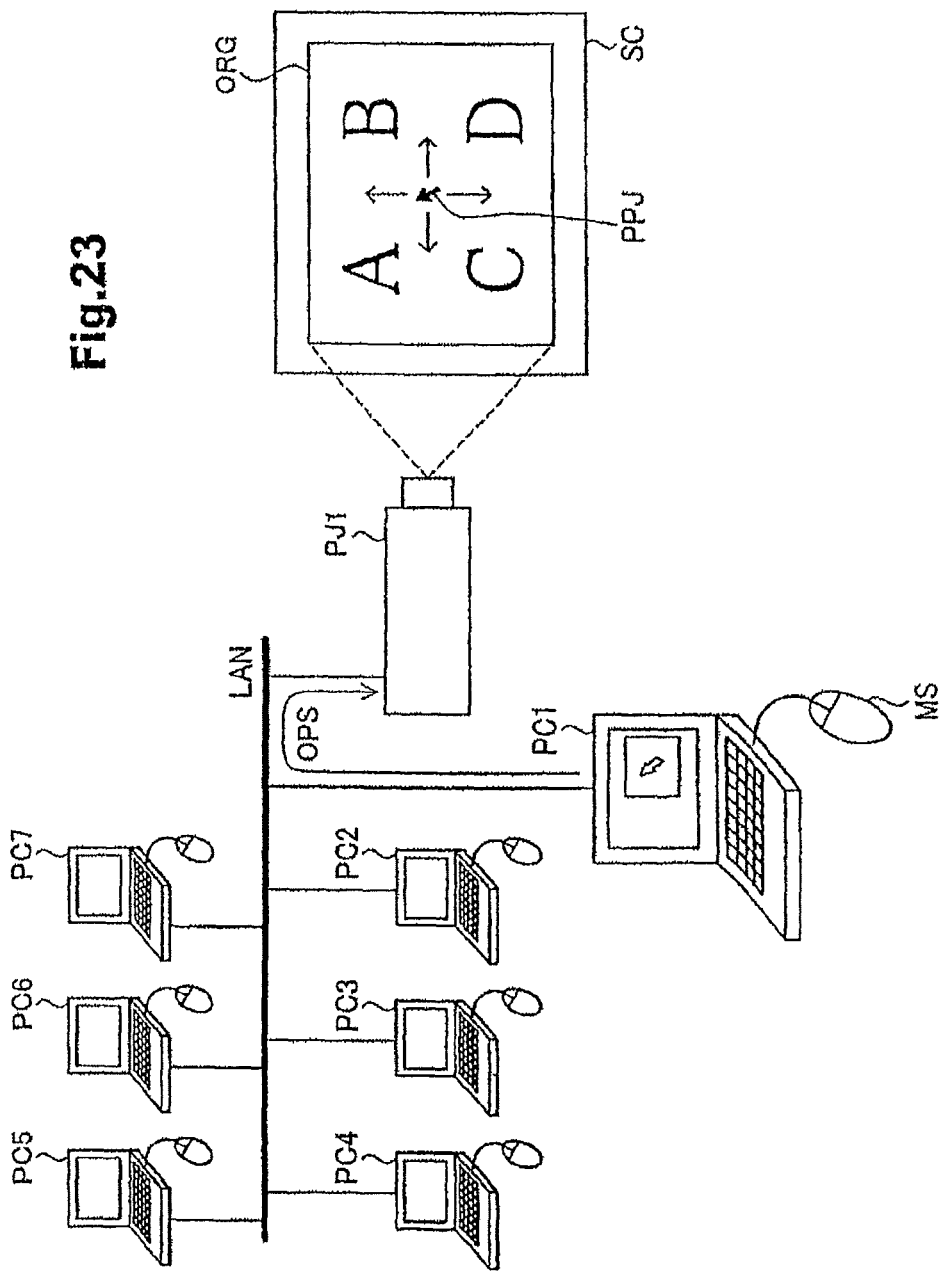
FIG. 23 shows one application of the projection display system of FIG. 20.

FIG. 23 shows one application of the projection display system of FIG. 20. In the projection display system of FIG. 23, a plurality of computers PC1, PC2, . . . are connected to one projector PJ1 via a LAN. In this projection display system, for example, when the mouse MS is moved in the first computer PC1, operation information OPS generated in response to the movement of the mouse MS is supplied to the projector PJ1 via the LAN. The projector PJ1 then moves the pointer image PPJ superimposed on the original image ORG displayed on the screen SC, in connection with the movement of the mouse MS. Such operations are also attained in the other computers PC2, PC3 . . . . This projection display system is effectively used for sequential presentations made by a plurality of people with one projector PJ1. Since there is no need of transferring one remote control RM among the respective presenters, the sequential presentations are performed smoothly.

Figure 24:
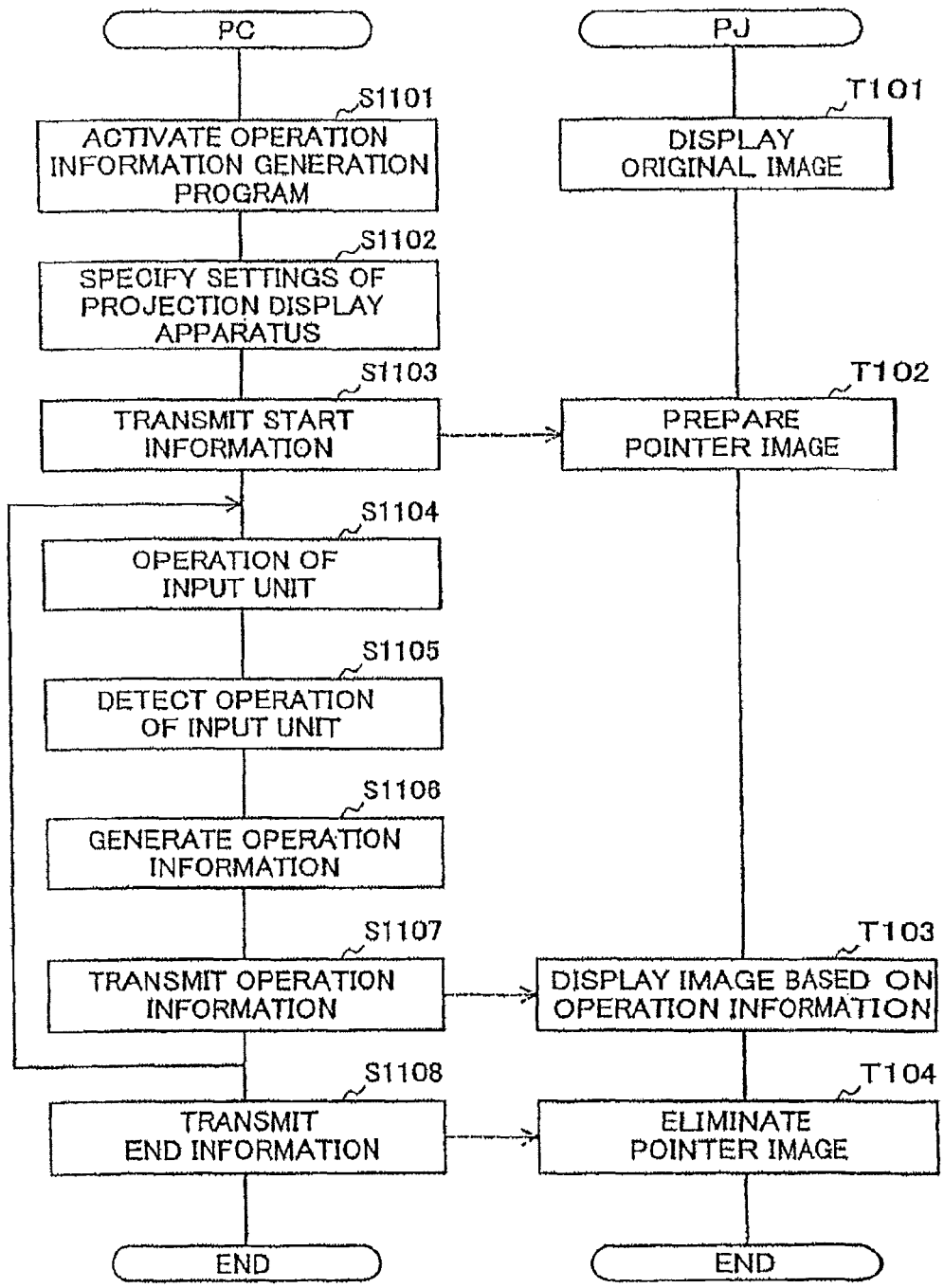
FIG. 24 is a flowchart showing series of processing executed by the projector PJ1 and the computer PC1.

FIG. 24 is a flowchart showing series of processing executed by the projector PJ1 and the computer PC1. The projector PJ1 displays the original image ORG on the screen SC at step T101.

At step S1101, the computer PC1 activates an operation information generation program to generate the operation information OPS in response to an operation of the input unit 1360. The operation information generation program stored in the external storage device 1310 shown in FIG. 22 is expanded in the RAM 1330 and works as the operation information generation module 1332. Activation of the operation information generation program causes an Operation Detection window DW to be open on the display unit 1350 of the computer PC1.

Figure 25:
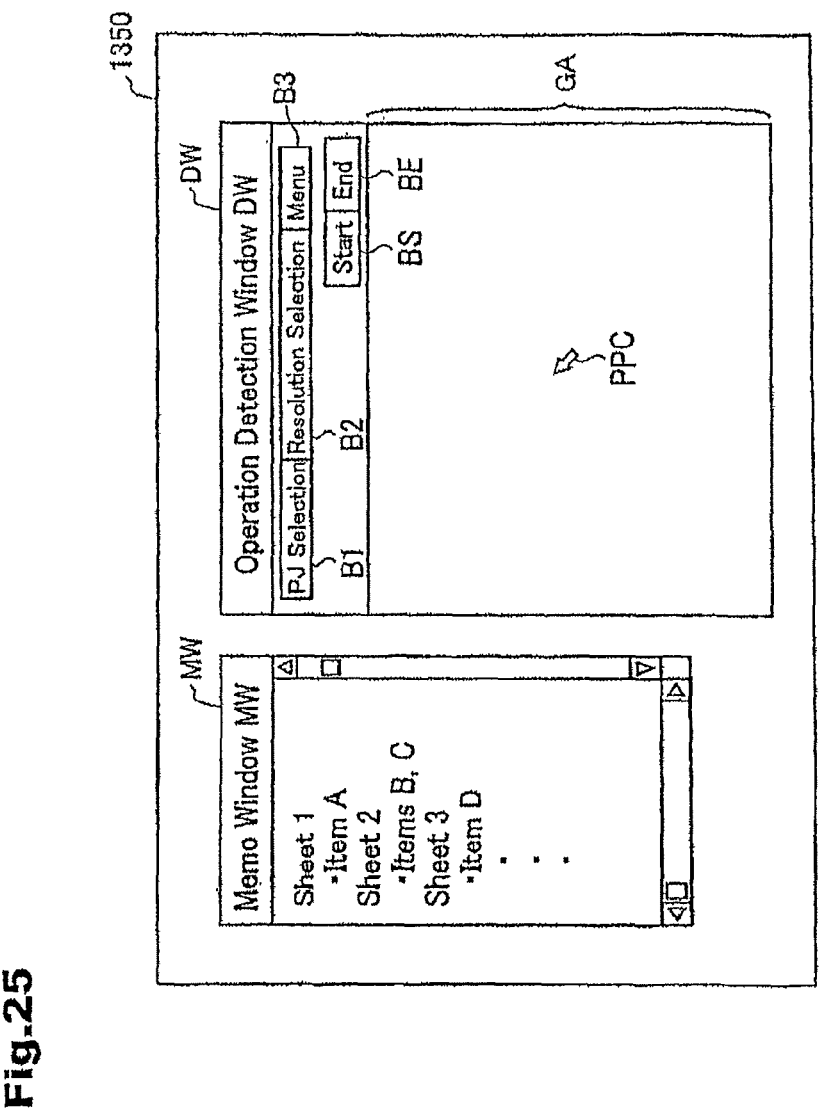
FIG. 25 shows an Operation Detection window DW open on a display unit 1350 of the computer PC1.

FIG. 25 shows the Operation Detection window DW open on the display unit 1350 of the computer PC1. The Operation Detection window DW and a Memo window MW for a memorandum, for example, in which the contents of a presentation are written, are open on the display unit 1350 shown in FIG. 25.

The Operation Detection window DW includes a 'PJ Selection' button B1, a 'Resolution Selection' button B2, a 'Menu' button B3, a 'Start' button BS, an 'End' button BE, and an operation information generation area GA. The operation information generation area GA represents an area in which the operation information OPS is generated in response to each operation of the mouse MS. In the example of FIG. 25, a pointer image PPC corresponding to the mouse MS is movable over the whole area of the display unit 1350. The operation information OPS in response to each operation of the mouse MS is generated, however, only when the pointer image PPC is present in the operation information generation area GA. While the user operates the mouse MS with the pointer image PPC out of the operation information generation area GA, the operation information OPS corresponding to the operation of the mouse MS is not generated. The user can thus perform other operations with the mouse MS, for example, an operation of changing the memorandum shown in the Memo window MW.

Referring back to FIG. 24, settings of the projector PJ1 are specified at step S1102. In a concrete procedure, the user selects a desired projector and sets the resolution suitable for the selected projector.

The user actuates the 'PJ Selection' button B1 included in the Operation Detection window DW to select the desired projector. A selection field (not shown) for selecting the projector is displayed in response to a click of the 'PJ Selection' button B1 with the mouse MS. In the case where a plurality of projectors are connected to the LAN, information on the plurality of projectors is displayed in the selection field. The user selects the desired projector 'PJ1' among one or plural projectors displayed in the selection field.

The user then actuates the 'Resolution Selection' button B2 included in the Operation Detection window DW to set the resolution suitable for the projector PJ1. A selection field (not shown) for selecting the resolution is displayed in response to a click of the 'Resolution Selection' button B2 with the mouse MS. For example, when the effective display area of the liquid crystal light valve 1130 (FIG. 21) in the projector PJ1 has a resolution XGA (1024×768), 'XGA' is selected as the resolution of the projector PJ1. Setting the resolution of the projector PJ1 causes the image area of the original image ORG projected and displayed on the screen SC to be mapped to the operation information generation area GA. Namely the positional relation of the pointer image PPC in the operation information generation area GA is made substantially coincident with the positional relation of the pointer image PPJ in the original image ORG.

On conclusion of the settings with regard to the projector PJ1 at step S1102, the computer PC1 outputs start information representing a start of transmission of the operation information OPS at step S1103. This is executed when the user actuates the 'Start' button BS included in the Operation Detection window DW. When the user clicks the 'Start' button BS, the start information is output from the network interface module 1380 to the network interface module 1180 of the projector PJ1 via the LAN.

When receiving the start information, the projector PJ1 prepares for display of the pointer image PPJ on the original image ORG in a superimposing manner at step T102. In a concrete procedure, the CPU 1100 causes the ornamental image processing module 1140 to generate pointer video data, based on the start information transmitted to the network interface module 1180.

In the application of FIG. 23, when the start information is transmitted from the first computer PC1 to the projector PJ1, the projector PJ1 carries out the processing only based on the operation information OPS output from the first computer PC1 and ignores information sent from any other computers PC2, PC3, . . . until output of end information (step S1108) discussed later. Namely the first computer PC1 exclusively uses the projector PJ1.

At step S1104, the user operates the mouse MS functioning as the input unit 1360. Here the operation of the mouse MS may be a motion of the mouse MS or a press of a switch on the mouse MS.

At step S1105, the computer PC1 detects the operation of the mouse MS functioning as the input unit 1360. At subsequent step S1106, the computer PC1 generates the operation information OPS, based on the result of the detection at step S1105.

As described previously, the operation information generation module 1332 of this embodiment detects the operation of the mouse MS only when the pointer image PPC corresponding to the mouse MS is present in the operation information generation area GA on the Operation Detection window DW. The position of the pointer image PPC in the operation information generation area GA is specified by coordinate values according to the preset resolution of the projector PJ1 (step S1102). In this embodiment, XGA (1024×768) is set to the resolution of the projector PJ1. The pointer images PPC present on the upper left corner, on the center, and on the lower right corner of the operation information generation area GA are respectively expressed by coordinate values (1,1), coordinate values (512,384), and coordinate values (1024,768). Such coordinate value information represents the positional information of the mouse MS and is output as the operation information OPS.

At step S1107, the computer PC1 transmits the operation information OPS. The operation information OPS is converted into a data format for the network and output by the network interface module 1380 (see FIG. 22).

The projector PJ1 displays an image based on the operation information OPS at step T103. In a concrete procedure, the pointer image PPJ is displayed at a predetermined position in the original image ORG (that is, a position corresponding to the position of the pointer image PPC in the operation information generation area GA), based on the operation information OPS. The computer PC1 supplies the operation information OPS to the projector PJ1, but does not supply pointer video data representing the pointer image PPJ.

Iterative execution of steps S1104 to S1107 and T103 enables the pointer image PPJ in the original image ORG projected and displayed on the screen SC to be moved in connection with the movement of the mouse MS.

At step S1108, end information representing an end of transmission of the operation information OPS is output. This is executed when the user actuates the 'End' button BE included in the Operation Detection window DW. When the user clicks the 'End' button BE, the end information is output from the network interface module 1380 to the network interface module 1180 of the projector PJ1 via the LAN.

When receiving the end information, the projector PJ1 eliminates the pointer image PPJ superimposed on the original image ORG at step T104. In a concrete procedure, the CPU 1100 causes the ornamental image processing module 1140 to stop the output of the pointer video data, based on the end information transmitted to the network interface module 1180.

The above description regards the operation of simply moving the mouse MS at step S1104. In the case where the user moves the mouse MS while pressing the switch on the mouse MS, an area may be specified in the projected and displayed image ORG. In the projector PJ1 of this embodiment, an ornamental image different from the pointer image, for example, a box image or a frame image, may be superimposed in the specified area on the original image ORG. As clearly understood from such discussion, not only the positional information of the mouse MS but switch information of the mouse MS is generated as the operation information OPS at step S1106.

Figure 26A:
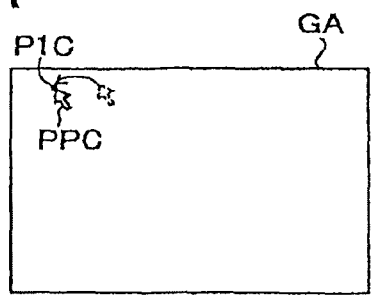
FIGS. 26A-26F show a process of superimposing a box image PB on an original image ORG by utilizing a pointer image PPJ in the original image ORG.
Figure 26D:
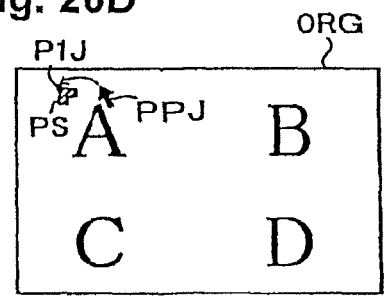
Figure 26B:
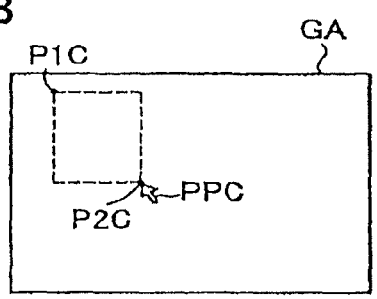
Figure 26E:
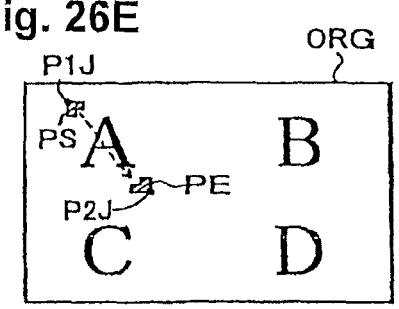
Figure 26C:
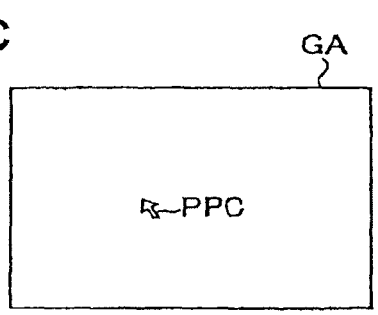
Figure 26F:
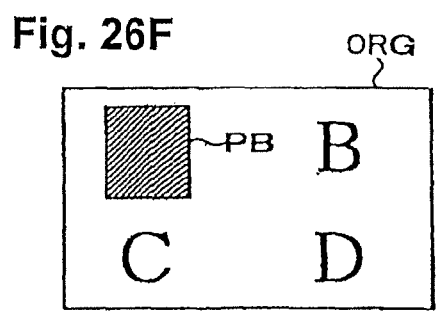

FIGS. 26A-26F show a process of superimposing a box image PB on the original image ORG by utilizing the pointer image PPJ in the original image ORG. The size of the box image PB is determined by specifying two opposing vertexes (a starting point and an end point) of the box image PB in the original image ORG. FIGS. 26A-26C show the operation information generation area GA included in the Operation Detection window DW (FIG. 25). FIGS. 26D-26F show the original image ORG displayed on the screen SC by the projector PJ1.

In FIG. 26A, the user operates the mouse MS of the computer PC1 to specify a starting point P1C for defining an area. In a concrete procedure, the use moves the mouse MS to move the pointer image PPC to the starting point P1C and presses the switch on the mouse MS at the starting point P1C. At this moment, a starting point P1J is specified by the pointer image PPJ in the original image ORG as shown in FIG. 26D. When the starting point P1J is specified in the original image ORG, a starting point image PS representing the starting point of the box image PB is superimposed at the position of the starting point P1J.

In FIG. 26B, the user moves the mouse MS to an end point P2C of the area while pressing the switch on the mouse MS. At this moment, a frame defined by a line segment connecting the starting point P1C with the end point P2C as a diagonal is shown by the broken line in the operation information generation area GA. In response to the appearance of the starting point image PS, an end point image PE replaces the pointer image PPJ and is used to specify an end point P2J in the original image ORG as shown in FIG. 26E.

In FIG. 26C, the user stops pressing the switch on the mouse MS. At this moment, the box image PB is superimposed in the area defined by the starting point P1J and the end point P2J on the original image ORG as shown in FIG. 26F.

Ornamental video data representing the ornamental images, that is, the starting point image PS, the end point image PE, and the box image PB are prepared by the ornamental image processing module 1140 (FIG. 21) and supplied to the image processing module 1110.

The type of the ornamental image, such as the box image PB, superimposed on the original image ORG is specified in advance by actuating the 'Menu' button B3 included in the Operation Detection window DW (FIG. 25). When the user clicks the 'Menu' button B3 in the computer PC1, menu display start information is output to the projector PJ1 via the LAN. The CPU 1100 in the projector PJ1 controls the menu image processing module 1150 and the image processing module 1110, based on the menu display start information transmitted to the network interface module 1180, and projects and displays a menu image as the original image ORG on the screen SC. The user selects a desired type of the ornamental image with the pointer image PPJ superimposed on the original image ORG (menu image). One modified arrangement may use the remote control RM to display the menu image and select the desired type of the ornamental image.

Figure 27:
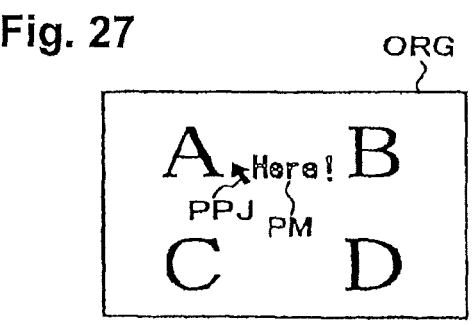
FIG. 27 shows an image projected and displayed in response to a user's operation of a keyboard KB as an input unit 1360.

The above description regards the case of operating the mouse MS as the input unit 1360 of the computer PC1. The operation information OPS is also generated in response to an operation of the keyboard KB functioning as the input unit 1360. When the user operates the keyboard KB at step S1104, the operation information generation module 1332 detects the key operation and generates the operation information OPS including key information based on the result of the detection at steps S1105 and S1106. At step T103, the projector PJ1 displays an image, based on the operation information OPS transmitted from the computer PC1 (step S1107). FIG. 27 shows an image projected and displayed in response to a user's operation of the keyboard KB as the input unit 1360. In the example of FIG. 27, a symbol image PM consisting of letters 'Here!' corresponding to the key information is superimposed in the vicinity of the position specified by the pointer image PPJ on the original image ORG. When the operation information OPS includes the key information, a symbol image of letters and the like is superimposed on the original image ORG. This enhances the effects of the presentation. Symbol video data representing the symbol image is prepared by the ornamental image processing module 1140 and supplied to the image processing module 1110.

In the third embodiment, the operation of the keyboard KB is also detected only when the pointer image PPC is present in the operation information generation area GA on the Operation Detection window DW (FIG. 25). The pointer image PPC out of the operation information generation area GA thus enables the user to perform other operations with the keyboard KB, for example, an operation of editing the contents of the memorandum in the Memo window MW.

As described above, the projection display system of the third embodiment includes the external input apparatus PC1 and the projector PJ1 that are connected with each other via the network NW. The external input apparatus PC1 has the operation information generation module 1332, which detects a user's operation of the input unit 1360 and generates the operation information based on a result of the detection. The projector PJ1 has the video data generation module 1100, 1110, and 1140 that generates video data DDV representing a resulting image, which is obtained by superimposing an ornamental image expressed by ornamental video data at a predetermined position on an original image expressed by original video data, based on the operation information OPS transmitted via the network NW. As mentioned above, the external input apparatus PC1 supplies the operation information OPS to the projector PJ1, but does not supply the ornamental video data representing the ornamental image to be displayed on the original image. The user can thus readily make the ornamental image superimposed on the original image by a simple operation of the input unit 1360 incorporated in the external input apparatus PC1.

G. Fourth Embodiment

The technique of the third embodiment causes the projector PJ1 (or the projection display apparatus PJ1) to superimpose the pointer image PPJ or an ornamental image different from the pointer image on the projected and displayed original image ORG, in response to a user's operation of the input unit 1360 of the computer PC1 (see FIG. 22). Another application allows the user to directly edit the contents of the projected and displayed original image ORG through operations of the input unit 1360 of the computer PC1.

The projector PJ1 (FIG. 21) stores an application program in the external storage device 1102 to attain such functions. When the projector PJ1 activates the application program stored in the external storage device 1102, the application program is expanded in the internal storage device (RAM) 1104 and executed by the CPU 1100. Execution window data generated by the application program is supplied to the image processing module 1110 and used as the original video data. This arrangement enables the user to directly edit the contents of the original image (execution window) ORG generated by the application program through operations of the input unit 1360 of the computer PC1.

The recent trend promotes the use of application programs by the SBC (Server Based Computing) method, although the application programs have conventionally been used by the download method. In the download method, the user dynamically downloads a desired application program from a server to a client machine and installs the downloaded application program on the client machine, so as to attain use of the application program.

In the SBC method, on the other hand, the user causes an application program to be executed on a server and utilizes an execution window of the application program on the server via a client machine. In this application, operation information of a keyboard or a mouse is supplied from the client machine to the server, while update data of the execution window is supplied from the server to the client machine. This arrangement separates the operations of the application program from the client machine, thus ensuring the use of the application program irrespective of the performance of the client machine. The execution window data is supplied in a specific format, and the client machine displays the execution window based on the supplied data in the specific format.

In the structure of the fourth embodiment, the projector PJ1 (projection-type display apparatus PJ1) may function as the client machine. In this case, there is no need of storing the application program in the projector PJ1. This accordingly enables reduction of the required storage capacities of the external storage device 1102 and the internal storage device 1104.

Figure 28:
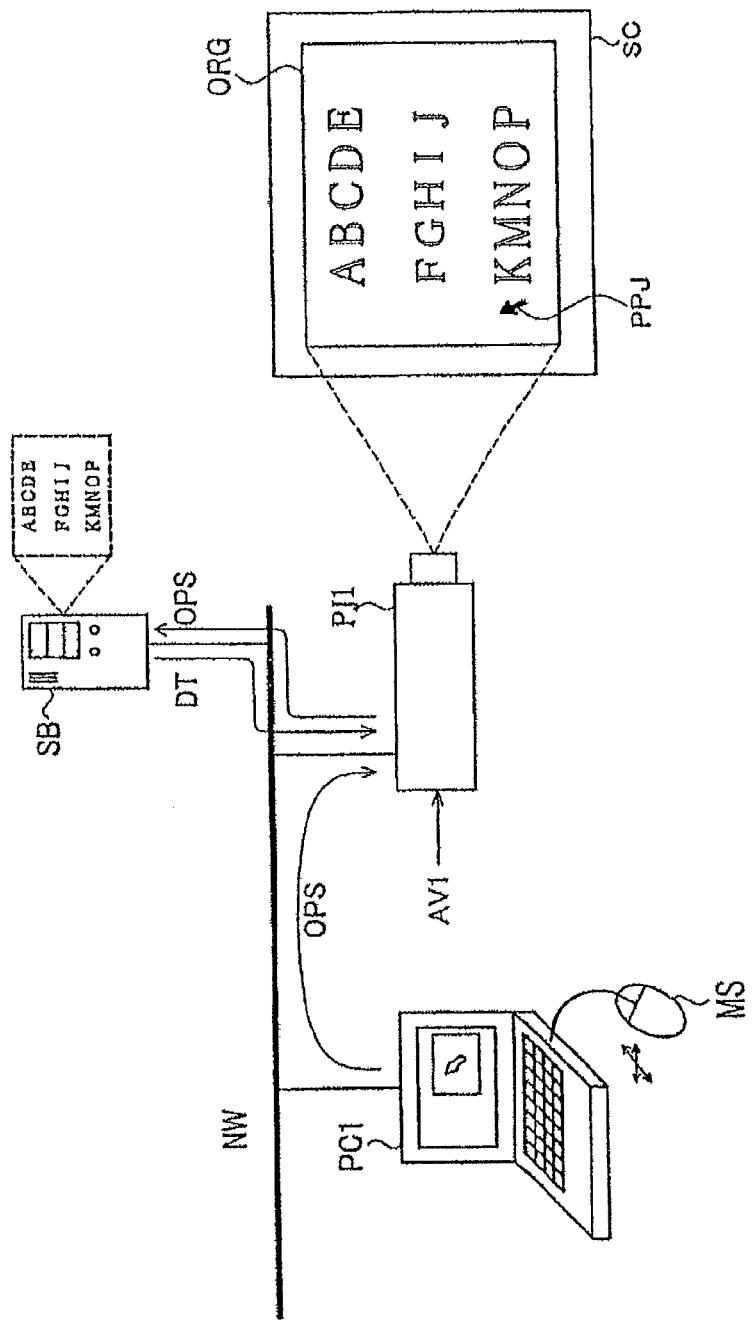
FIG. 28 shows a projection display system in a fourth embodiment.

FIG. 28 shows a projection display system in the fourth embodiment. The projection display system includes a projector PJ1 (projection-type display apparatus PJ1), a computer PCs, and a server SB. The projector PJ1, the computer PC1, and the server SB are mutually connected via a network NW.

The projector PJ1 functions as the client machine discussed above and causes an execution window of an application program supplied from the server SB to be projected and displayed on a screen SC. The internal structure of the projector PJ1 is substantially similar to that of FIG. 21 and is thus not specifically described here. The difference is that the network interface module 1180 (see FIG. 21) has a non-illustrated internal viewer module, which prepares execution window data representing the execution window based on supplied data DT in a specific format. The execution window data is supplied to the image processing module 1110 (see FIG. 21) and used as the original video data.

Like the system including the projector PJ1 that stores the application program in its external storage device 1102, in this projection display system, the user operates the input unit 1360 (see FIG. 22) of the computer PC1 to directly edit the contents of the projected and displayed original image (execution window) ORG.

Figure 29A:
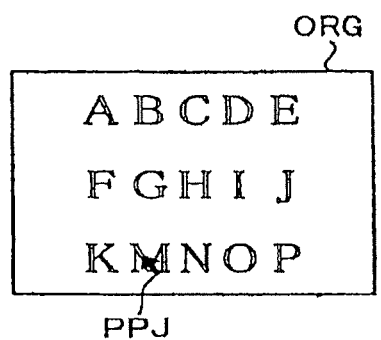
FIG. 29A-29C show a series of processing to directly edit the contents of an original image ORG projected and displayed on a screen SC.
Figure 29B:
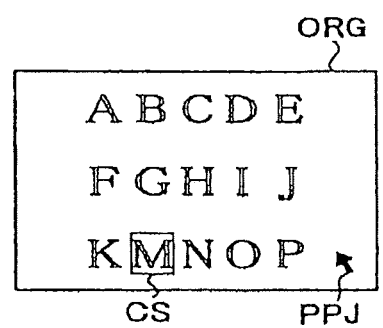
Figure 29C:
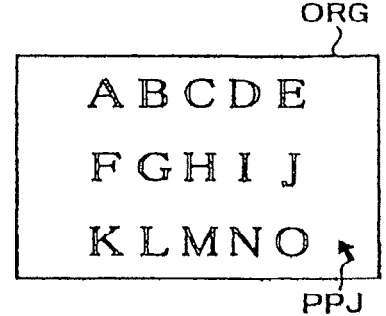
Figure 30:
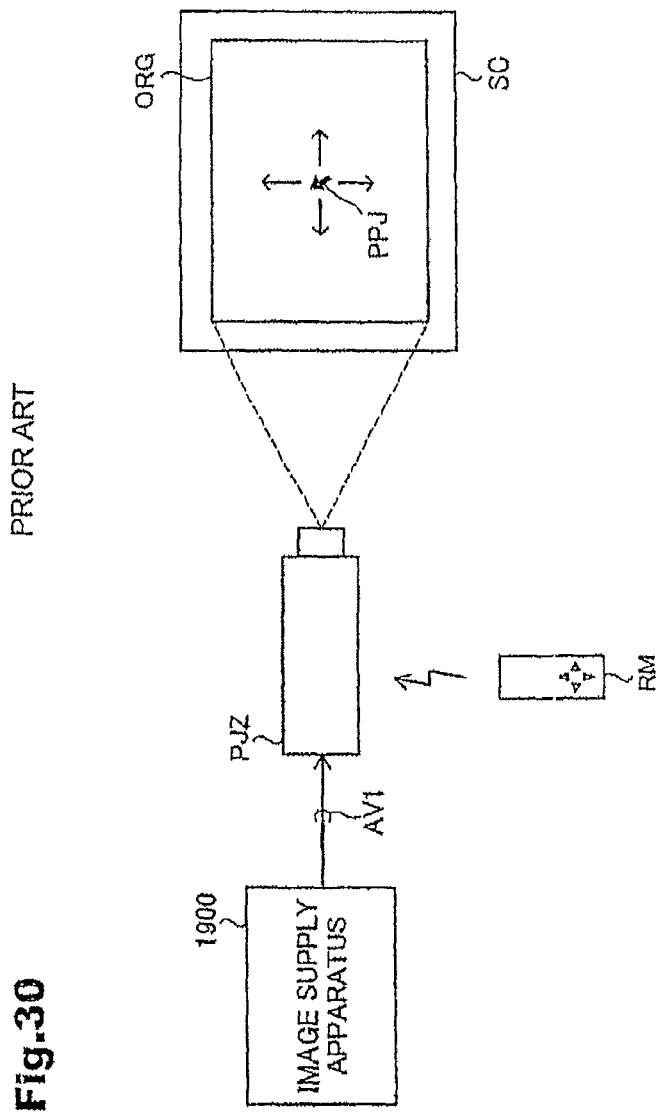
FIG. 30 shows a prior art projector.

FIGS. 29A-29C show a series of processing to directly edit the contents of the original image ORG projected and displayed on the screen SC. In the example of FIGS.

29A-29C, an execution window generated by a word processing program is displayed as the original image ORG.

In the state of FIG. 29A, the user moves a mouse MS attached to the computer PC1 to superimpose a pointer image PPJ at a desired position on the projected and displayed original image (execution window) ORG. Like the first embodiment, the operation information OPS that is supplied from the computer PC1 and includes positional information is used for the process of superimposing the pointer image PPJ in the projector PJ1. In this state shown in FIG. 29A, the pointer image PPJ is superimposed at the position of a letter 'M' on the original image ORG.

In the state of FIG. 29B, the user presses (clicks) a switch mounted on the mouse MS and causes a cursor CS to be displayed at a desired position in the original image (execution window) ORG. The operation information that is supplied from the computer PC1 and includes switch information is first supplied to the projector PJ1, which then transmits the supplied operation information OPS to the server SB via the network NW. The server SB causes the cursor to be displayed at a desired position in the execution window generated by the word processing program, based on the operation information OPS including the positional information of the mouse MS and the switch information. The server SB supplies the updated window with the cursor to the projector PJ1 via the network NW, and the projector PJ1 projects and displays the updated window as the original image ORG on the screen SC. In this state shown in FIG. 29B, the projector PJ1 superimposes the pointer image PPJ on the original image (updated window) ORG, based on the operation information OPS.

In the state of FIG. 29C, the user operates a key on a keyboard KB attached to the computer PC1, so as to input a letter or symbol at the cursor position in the original image ORG. The operation information OPS that is supplied from the computer PC1 and includes key information is first supplied to the projector PJ1, which then transmits the supplied operation information OPS to the server SB via the network NW. The server SB inputs the letter or symbol at the cursor position in the execution window generated by the word processing program, based on the operation information OPS including the key information of the keyboard KB. The server SB supplies the edited updated window to the projector PJ1 via the network NW, and the projector PJ1 projects and displays the updated window as the original image ORG on the screen SC. In this state shown in FIG. 29C, the displayed original image (updated window) ORG includes a letter 'L' inserted between letters 'K' and 'M'.

As shown in FIGS. 29A to 29C, the user operates the input unit 1360 attached to the computer PC1 to directly edit the contents of the projected and displayed image (execution window) ORG. In the example of FIGS. 29A-29C, the projector PJ1 projects and displays the execution window of the application program supplied from the server SB on the screen SC. The contents of the original image (execution window) ORG may also directly be edited when the projector PJ1 projects and displays an execution window generated by an application program stored in the internal storage device 1104. The advantage of the former arrangement is reduction of the required storage capacities of the external storage device 1102 and the internal storage device 1104 of the computer PC1 as mentioned previously. The advantage of the latter arrangement is, on the other hand, that the projector PJ1 is not required to transmit the operation information OPS, which has been supplied from the computer PC1, to the server SB. The CPU 1100 in the projector PJ1 causes the network interface module 1180 to implement the supply of the operation information OPS from the projector PJ1 to the server SB.

In the arrangement of the third embodiment, an ornamental image, which is different from the pointer image PPJ, is superimposed on the original image ORG through an operation of the input unit 1360 at the position of the pointer image PPJ superimposed on the original image ORG. In the arrangement of the fourth embodiment, on the other hand, the contents of the original image (execution window) ORG are edited through an operation of the input unit 1360 at the position of the pointer image PPJ superimposed on the original image ORG. The technique of the fourth embodiment may also superimpose an ornamental image, which is different from the pointer image PPJ, on the original image (execution window) ORG. The projector PJ1 thus differentiates the process of superimposing the ornamental image on the original image ORG (ornament mode) from the process of directly editing the contents of the original image (execution window) ORG, based on the operation information OPS supplied after the superposition of the pointer image PPJ on the original image (ORG). The changeover of the processing mode is carried out on a menu window, and the CPU 1100 (see FIG. 21) controls the respective elements according to the selected processing mode.

As described above, the projection display system of the fourth embodiment includes the external input apparatus PC1 and the projector PJ1 that are connected with each other via the network NW. The external input apparatus PC1 has the operation information generation module 1332, which detects a user's operation of the input unit 1360 and generates the operation information OPS based on a result of the detection. The projector PJ1 has the video data processing module 1100, 1110, and 1140 that generates video data DDV representing a resulting image, which is obtained by superimposing the pointer image at a predetermined position on the original image ORG and editing the contents of the original image (execution window) ORG, based on the operation information OPS supplied via the network NW. The user's operation of the input unit 1360 incorporated in the external input apparatus PC1 enables the projector PJ1 to readily execute the series of processing with regard to the contents of the image to be projected and displayed.

The projector, the projection display system, and the corresponding method and recording medium of the present invention are discussed above with the first through the fourth embodiments. These embodiments are, however, to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given below.

(1) For example, in the first embodiment, the action of dragging and dropping the file ion FL onto the projector icon PJ on the display 54 sets the projector 10 as the destination of transfer and storage of the corresponding data file. The destination of transfer and storage may be set to the file server FS connecting with the network. For example, in the event that a large number of people make sequential presentations, the total capacity of file data may exceed the storage capacity of the external storage device 41 of the projector 10. In such cases, required files may be stored in the file server FS.

(2) The following procedure may be applied for reproduction of a file. The projector 10 collects in advance the file information stored in the file server FS and displays the file information on the file selection window for selection of a file. When a file stored in the file server FS is selected, the projector 10 transmits a selected file transfer requirement to the file server FS. The projector 10 receives the selected file and carries out its projection and display.

(3) In the case where the personal computer PC has a PCMCIA slot, a PC memory card set in the PCMCIA slot may be set to the destination of the file transfer from the personal computer PC. In such cases, even when the projector 10 is not connected to the network, insertion of the PC memory card into the projector 10 after the file transfer from the personal computer PC to the PC memory card exerts the similar functions and effects to those discussed in the above embodiments. Setting a password is naturally required in the case of transferring a file to the PC memory card.

(4) The procedure of the first embodiment sets the password with the numerals 1 to 5. This range is set only corresponding to the available numerals on the remote control 40 as mentioned previously. The password may be set with numerals and letters other than 1 to 5 when the numerals and letters other than 1 to 5 are available on the remote control 40. In one possible application, the remote control 40 has a liquid crystal window and a password of letters and numerals may be input through operations of the joy stick 402. In another possible application, numerals and letters may be input through operations of a wireless keyboard.

(5) The technique of the first embodiment transfers the file with the password assigned thereto to the external storage device 41 of the projector 10. In one modified arrangement, the personal computer PC encodes a file and transfers the encoded file to the projector 10, which then decodes the transferred encoded file. Such modification enhances the security level in the process of the file transfer via the network line NL.

(6) The respective windows on the display 54 and on the projection display screen SR in the first embodiment are only illustrative and may adequately be changed and modified in practice.

(7) In the first embodiment, the ASP terminal module 20 is used as the representative of the network terminal module. The projector 10 is, however, not restricted to the ASP terminal. One modified arrangement receives application data (a file) via the network, opens the input file according to a viewer application, and projects and displays an image corresponding to the file. In such cases, the projector 10 may identify the type of the input file and automatically activate an optimum viewer application for the identified file type. Otherwise the server may transmit an activation command for activating an optimum viewer application simultaneously with the file to the projector 10.

(8) In the first embodiment, each of the ASP terminal module 20 and the projector module 30 is provided with the CPU, the RAM, and the ROM. These elements may, however, be included in only the ASP terminal module 20. In such cases, the CPU in the ASP terminal module 20 controls the projector module 30.

(9) In the structure of the first embodiment, the projector module 30 includes the external video signal input terminal 312 and the external audio signal input terminal 322. These elements may, however, be omitted in the case where the projector is exclusively used under the connection with the network. This is because the video data and the audio data are supplied via the network line NL in such cases.

(10) The various interface controllers are used in the structure of the first embodiment, but some of these internal controllers may be omitted according to the requirements, except the network interface controller 220.

(11) In the third and the fourth embodiments, the computer PC1 uses the mouse MS as the input unit 1360. The mouse MS may be replaced by another pointing device, such as a tablet, track ball, a track pad, or a joy stick. These pointing devices have similar functions to those of the mouse MS and correspond to the pointing device of the present invention.

(12) In the third and the fourth embodiments, the superimposing position of the pointer image PPJ on the original image ORG is specified with the mouse MS functioning as the input unit 1360. In the structure without the mouse MS as the input unit 1360, the superimposing position of the pointer image PPJ may be specified with direction keys on the keyboard KB or with the ten keys on the keyboard KB. The direction keys and the ten keys on the keyboard KB also function as the pointing device of the present invention.

(13) In the third and the fourth embodiments, the positional information of the mouse MS included in the operation information OPS is expressed by coordinate values. The positional information may alternatively be expressed by vector values representing travels. In the latter case, two-way communication is desired. In the case where a series of positional information generated in response to a movement of the mouse MS is expressed by vector values, if part of the positional information is not transmitted to the projector PJ1, the positional relation of the pointer image PPC in the operation information generation area GA may not be coincident with the positional relation of the pointer image PPJ in the projected and displayed original image ORG. When the positional information is expressed by vector values representing travels, it is preferable that the projector PJ1 transmits a receive signal to the computer PC every time the projector PJ1 receives the operation information OPS. When no receive signal is given, the computer PC1 again transmits the operation information OPS. In the case where a series of positional information generated in response to a movement of the mouse MS is expressed by coordinate values, on the other hand, even when part of the positional information is not transmitted to the projector PJ1, the positional relation of the pointer image PPC in the operation information generation area GA is substantially coincident with the positional relation of the pointer image PPJ in the projected and displayed original image ORG. Namely the expression of the positional information by coordinate values advantageously requires only one-way communication from the computer PC1 to the projector PJ1. In general, the operation information OPS may be transmitted by one-way communication from the computer PC1 to the projector PJ1 or by two-way communication between the projector PJ1 and the computer PC1.

(14) In the third and the fourth embodiments, the operation information generation module 1332 included in the RAM 1330 of the computer PC1 causes the operation information generation area GA (FIG. 25) to be displayed on the display unit 1350. Display of the operation information generation area GA is, however, not essential. In the arrangement without the operation information generation area GA, the operation information OPS in response to an operation of the mouse MS is generated when the pointer image PPC is present at any place in the whole display area on the display unit 1350.

(15) In the third and the fourth embodiments, the computer PC1 has the display unit 1350. The display unit 1350 may, however, be omitted. In general, the external input apparatus of the present invention should include the input unit, the operation information generation module for detecting a user's operation of the input unit and generating operation information based on the result of the detection, and the network interface module connecting with the network to supply the operation information to the projector via the network.

(16) In the third and the fourth embodiments, the user operates the input unit 1360 of the computer PC1 to make an ornamental image, such as the pointer image PPJ, superimposed on the original image ORG or to directly edit the contents of the original image (execution window) ORG generated by an application program. The user may also cause the projector PJ1 to carry out another series of processing on the image to be projected and displayed through operations of the input unit 1360 of the computer PC1.

When the projector PJ1 requires input of the name of video data in the process of storing the video data in the external storage device 1102, the user may operate the keyboard KB of the computer PC1 to input and display the name of the video data on a data name input window.

When the projector PJ1 requires input of a password in the process of using video data stored in a memory card MC as original video data, the user may operate the keyboard KB of the computer PC1 to input and display the password on a password input window. It is preferable that a symbol like '*' different from the symbol actually input by the user appears on the projected and displayed password input window.

In general, the video data generation module included in the projector of the present invention should carry out a predetermined process regarding contents of an image to be projected and displayed and generate resulting video data representing a projected and displayed image, based on the operation information generated in response to an operation of the input unit of the external input apparatus and transmitted to the network interface module via the network.

The predetermined process regarding the contents of the image to be projected and displayed, which is carried out by the video data generation module, represents a process of changing the display contents of the image (that is, the picture of the image) based on the operation information, for example, a process of causing an ornamental image expressed by ornamental video data to be superimposed at a predetermined position on an original image expressed by original video data.

(17) In the respective embodiments discussed above, part of the hardware structure may be replaced by the software configuration, while part of the software configuration may be replaced by the hardware structure. For example, part of the functions of the two CPUs 200 and 300 (see FIG. 2) may be executed by specific hardware circuits.

(18) The above embodiments regard the projectors utilizing the transmission-type liquid crystal panel. The technique of the present invention is also applicable to other types of projectors, for example, those utilizing a reflection-type liquid crystal panel, those utilizing a Micromirror Device (trade mark by Texas Instruments Inc.), and those using a CRT.

The invention claimed is:

1. A projector connecting with an external input apparatus having an input unit via a network, said projector comprising:
   a network interface module that connects with the network;
   a video data generation module that executes a predetermined series of processing with regard to contents of an image to be projected and displayed and generates video data representing the image to be projected and displayed, based on operation information generated through an operation of said input unit of said external input device and supplied to said network interface module via the network, the image to be projected and displayed including an original image and an ornamental image superimposed on the original image, the operation information including at least positional information, which is generated through an operation of a pointing device used as said input unit of said external input apparatus, said video data generation module superimposing a pointer image as the ornamental image at a predetermined position on the original image, based on the positional information, said video data generation module requiring an input password to be coincident with a preset password to enable the ornamental image to be projected and displayed;
   an electro-optic device that generates an image ray according to the video data; and
   a projection optical system that projects the image ray generated by said electro-optic device.

2. A projector in accordance with claim 1, wherein ornamental video data representing the ornamental image is not supplied from said external input apparatus but is prepared by said video data generation module, and
said video data generation module combines original video data representing the original image with the ornamental video data to generate the video data, based on the operation information supplied from said external storage device, thereby superimposing the ornamental image at the predetermined position on the original image.

3. A projector in accordance with claim 2, wherein the positional information includes coordinate value information specified by said pointing device.

4. A projector in accordance with claim 2, wherein the operation information further includes switch information generated through an operation of a switch mounted on said pointing device, and
said video data generation module superimposes an ornamental image, which is different from the pointer image, in a specified area on the original image, based on the positional information and the switch information included in the operation information.

5. A projector in accordance with claim 4, wherein the operation information further includes key information generated through an operation of a keyboard as said input device of said external input apparatus, and
said video data generation module superimposes a symbol image as the ornamental image on the original image, based on the key information.

6. A projection display system comprising an external input apparatus and a projector connecting with each other via a network,
said external input apparatus comprising:
an input unit, said input unit comprising a pointing device;
an operation information generation module that detects a user's operation of said input unit and generates operation information based on a result of the detection, the operation information including at least positional information generated through an operation of said pointing device; and
a first network interface module that connects with the network and supplies the operation information to said projector via the network,
said projector comprising:

a second network interface module that connects with the network;

a video data generation module that executes a predetermined series of processing with regard to contents of an image to be projected and displayed and generates video data representing the image to be projected and displayed, based on the operation information supplied to said second network interface module via the network, the image to be projected and displayed including an original image and an ornamental image superimposed on the original image, said video data generation module superimposing a pointer image as the ornamental image at a predetermined position on the original image, based on the positional information, said video data generation module requiring an input password to be coincident with a preset password to enable the ornamental image to be projected and displayed;

an electro-optic device that generates an image ray according to the video data; and a projection optical system that projects the image ray generated by said electro-optic device.

7. A projection display system in accordance with claim 6, wherein ornamental video data representing the ornamental image is not supplied from said external input apparatus but is prepared by said video data generation module, and said video data generation module combines original video data representing the original image with the ornamental video data to generate the video data, based on the operation information supplied from said external storage device, thereby superimposing the ornamental image at the predetermined position on the original image.

8. A projection display system in accordance with claim 7, wherein said external input apparatus further comprises a display unit, and said operation information generation module causes an operation information generation area, in which the operation information is generated in response to the operation of said pointing device, to be displayed on said display unit, and detects the operation of said pointing device only when a pointer image corresponding to said pointing device is present in the operation information generation area.

9. A projection display system in accordance with claim 8, wherein the operation information generation area is mapped to an image area to be projected and displayed.

10. In an external input apparatus having an input unit, a method of generating operation information that is generated through an operation of said input unit and is supplied to a projector, which is connected to said external input apparatus via a network, said method comprising the steps of:

(a) detecting a user's operation of said input unit, said step
  (a) comprising the steps of:
    (a-1) causing an operation information generation area, in which the operation information is generated in response to an operation of a pointing device as said input unit, to be displayed on a display unit incorporated in said external input apparatus;
    (a-2) allowing the display only when an input password is coincident with a preset password; and
    (a-3) detecting the operation of said pointing device only when a pointer image corresponding to said pointing device is present in the operation information generation area;

(b) generating the operation information, based on a result of the detection; and (c) projecting the operation information on the display unit.

11. In an external input apparatus having an input unit, a computer readable recording medium in which a computer program is recorded, said computer program generating operation information that is generated through an operation of said input unit and is supplied to a projector, which is connected to said external input apparatus via a network, said computer program causing a computer to attain the functions of:

detecting a user's operation of said input unit, said function of detecting the user's operation of said input unit comprising the functions of:

causing an operation information generation area, in which the operation information is generated in response to an operation of a pointing device as said input unit, to be displayed on a display unit incorporated in said external input apparatus;

allowing the display only when an input password is coincident with a preset password; and detecting the operation of said pointing device only when a pointer image corresponding to said pointing device is present in the operation information generation area;

generating the operation information, based on a result of the detection; and projecting the operation information on the display unit.

* * * * *